(12) United States Patent
Schwartz

(10) Patent No.: US 11,498,728 B2
(45) Date of Patent: Nov. 15, 2022

(54) PRODUCT CONTAINERS AND CLOSURE ASSEMBLIES FOR PRODUCT CONTAINERS

(71) Applicant: KAO USA Inc., Cincinnati, OH (US)

(72) Inventor: Steven J. Schwartz, California, KY (US)

(73) Assignee: KAO USA INC., Cincinnati, OH (US)

( * ) Notice: Subject to any disclaimer, the term of this patent is extended or adjusted under 35 U.S.C. 154(b) by 0 days.

(21) Appl. No.: 17/563,428

(22) Filed: Dec. 28, 2021

(65) Prior Publication Data

US 2022/0204226 A1 Jun. 30, 2022

Related U.S. Application Data

(60) Provisional application No. 63/132,102, filed on Dec. 30, 2020.

(51) Int. Cl.
*B65D 47/24* (2006.01)
*B65D 51/24* (2006.01)

(52) U.S. Cl.
CPC ......... *B65D 47/243* (2013.01); *B65D 51/248* (2013.01)

(58) Field of Classification Search
CPC .. B65D 47/261; B65D 47/248; B65D 47/246; B65D 41/28; B65D 41/0442; B65D 41/0492; B65D 47/061; B65D 47/241; B65D 51/1683; B65D 47/243; B65D 51/248; E03C 1/23; E03C 1/2306; A47G 19/2288; A47G 19/2272; A47J 41/0022
See application file for complete search history.

(56) References Cited

U.S. PATENT DOCUMENTS

| | | | |
|---|---|---|---|
| 1,793,048 A * | 2/1931 | Brigel | B65D 45/02 |
| | | | 215/277 |
| 2,557,917 A * | 6/1951 | Schlesinger | B65D 47/248 |
| | | | 222/522 |
| 2,591,465 A | 4/1952 | Vladimir | |

(Continued)

FOREIGN PATENT DOCUMENTS

| | | |
|---|---|---|
| CN | 105996668 B | 9/2017 |
| DE | 202009014964 U1 | 3/2010 |

(Continued)

OTHER PUBLICATIONS

International Search Report and Written Opinion for Appl. No. PCT/US2021/065374 dated Apr. 19, 2022, 14 pages.

*Primary Examiner* — Donnell A Long
(74) *Attorney, Agent, or Firm* — Dinsmore & Shohl LLP

(57) ABSTRACT

A closure assembly includes a top, a base, and a follower. The top includes a plurality of top teeth extending from the inner surface and arranged around a fluid orifice. The base is coupled to the top, wherein the top is moveable relative to the base. The base includes a central hub defining a cam path. The follower includes a plurality of top follower teeth engaged with the plurality of top teeth of the top and a plurality of base follower teeth disposed in the cam path of the base. The top and the follower are biased away from the base, and depressing the top relative to the base causes the follower to rotate relative to the top between an open position in which a fluid flow path is open to the fluid orifice and a closed position in which the fluid flow path is closed to the fluid orifice.

20 Claims, 26 Drawing Sheets

(56) References Cited

U.S. PATENT DOCUMENTS

| | | | | |
|---|---|---|---|---|
| 2,963,205 | A * | 12/1960 | Beall, Jr. | B65D 47/248 222/514 |
| 3,220,695 | A | 11/1965 | Downey et al. | |
| 5,392,967 | A * | 2/1995 | Satomi | B65D 47/248 222/509 |
| 5,435,470 | A * | 7/1995 | Kim | A47J 41/0027 222/509 |
| 5,495,966 | A * | 3/1996 | Won | A47J 41/0027 222/545 |
| 5,842,612 | A * | 12/1998 | Won | B65D 47/248 222/509 |
| 5,944,235 | A * | 8/1999 | Won | B65D 47/286 222/509 |
| 6,299,037 | B1 | 10/2001 | Lee | |
| 6,662,978 | B2 | 12/2003 | Lin et al. | |
| 6,702,138 | B1 | 3/2004 | Bielecki et al. | |
| 6,923,345 | B1 * | 8/2005 | Laible | B67D 7/0294 222/189.09 |
| 6,945,432 | B2 * | 9/2005 | Laible | B67D 7/0294 222/518 |
| 6,945,433 | B2 * | 9/2005 | Laible | B67D 7/0294 222/481.5 |
| 6,986,443 | B2 * | 1/2006 | Laible | B67D 7/0294 222/189.09 |
| 7,073,678 | B1 | 7/2006 | Dibdin et al. | |
| 7,287,670 | B2 * | 10/2007 | Yoshida | G01F 11/32 222/61 |
| 7,299,956 | B2 * | 11/2007 | Haglund | B67D 3/0032 222/518 |
| 7,571,830 | B2 * | 8/2009 | Lin | A47J 41/0016 206/217 |
| 8,083,107 | B2 * | 12/2011 | Laible | B65D 47/32 222/189.09 |
| 8,272,532 | B2 * | 9/2012 | Michaelian | A47G 19/2272 220/203.23 |
| 8,348,078 | B2 | 1/2013 | Lane | |
| 8,708,203 | B2 * | 4/2014 | Laible | B65D 47/122 222/481.5 |
| 9,452,868 | B2 * | 9/2016 | Garcia Cortes | B65D 47/127 |
| 2007/0181603 | A1 | 8/2007 | Vangeel et al. | |
| 2010/0200602 | A1 | 8/2010 | Chan | |
| 2017/0318993 | A1 | 11/2017 | Young | |

FOREIGN PATENT DOCUMENTS

| | | |
|---|---|---|
| DE | 102010060291 A1 | 5/2011 |
| DE | 202017100771 U1 | 6/2018 |
| KR | 200439647 Y1 | 4/2008 |
| WO | 2015010873 A1 | 1/2015 |

* cited by examiner

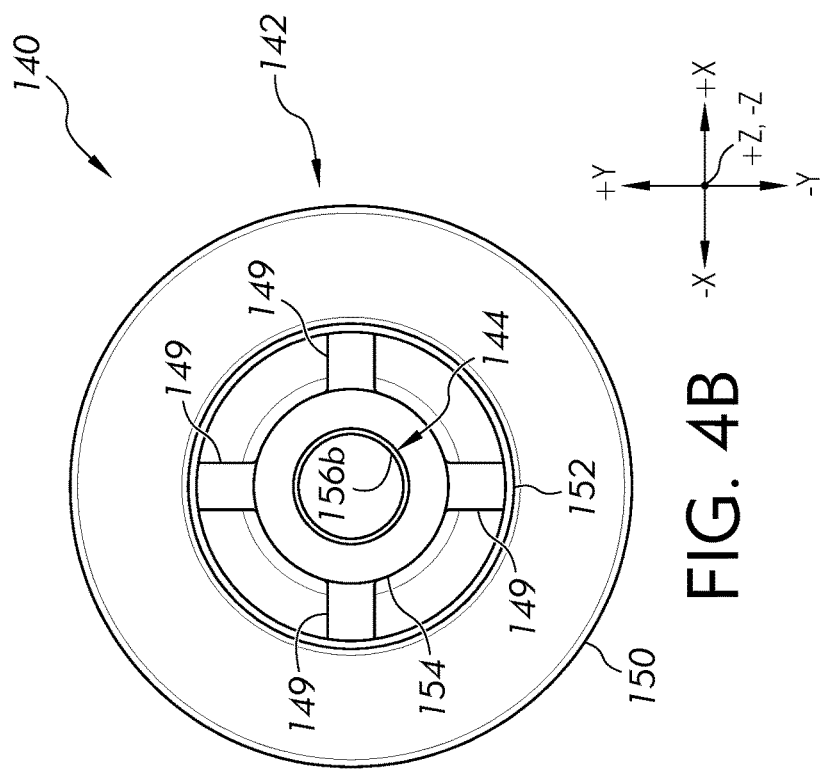
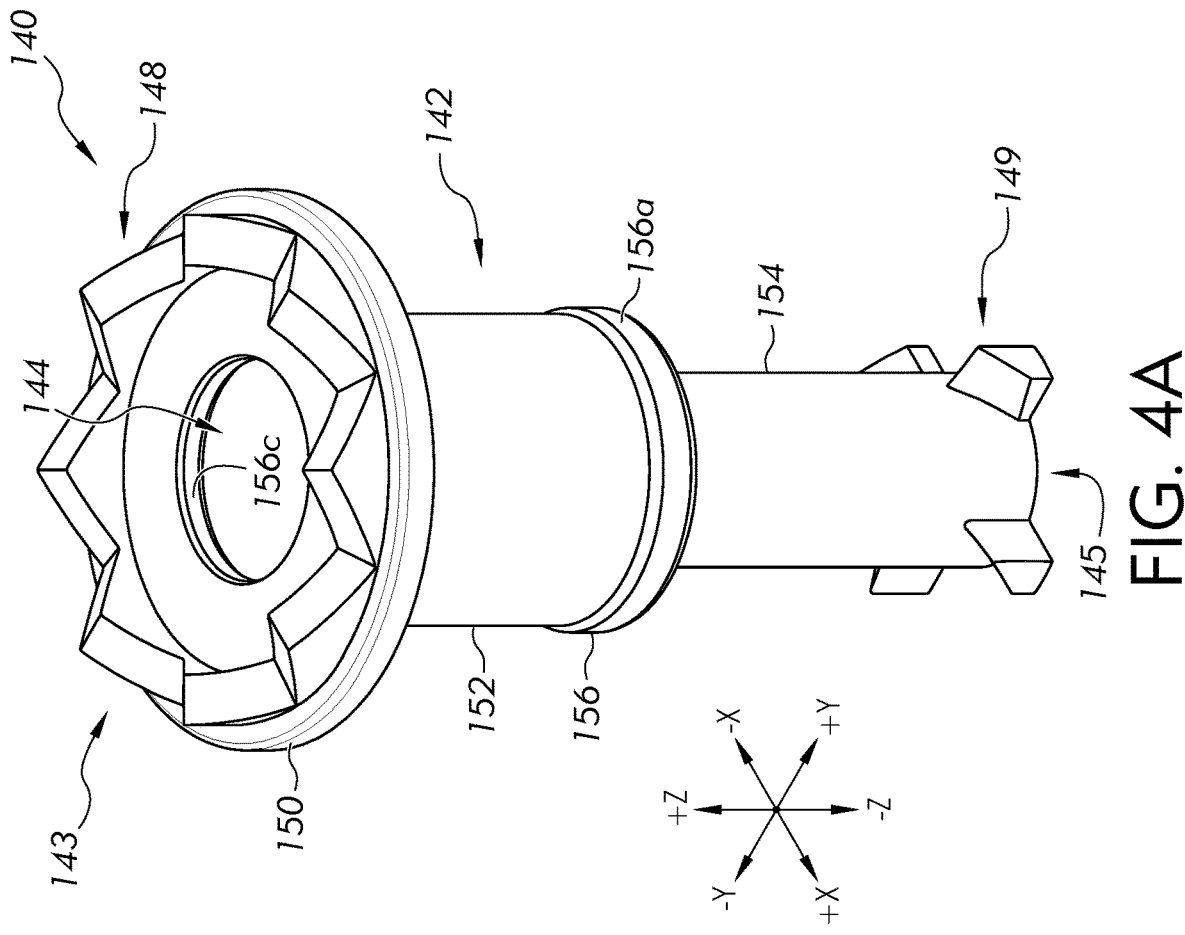
FIG. 4B
FIG. 4A

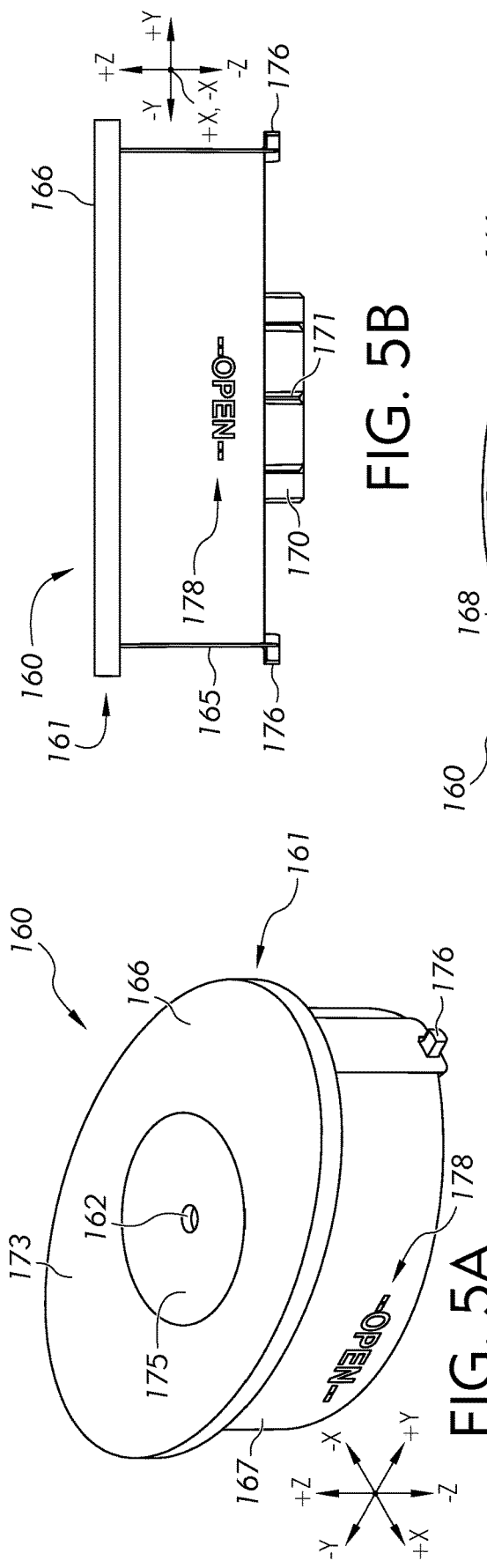

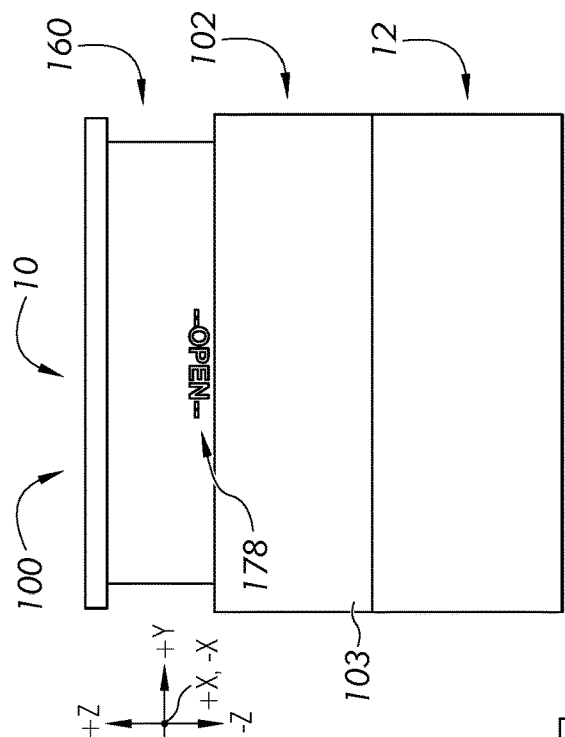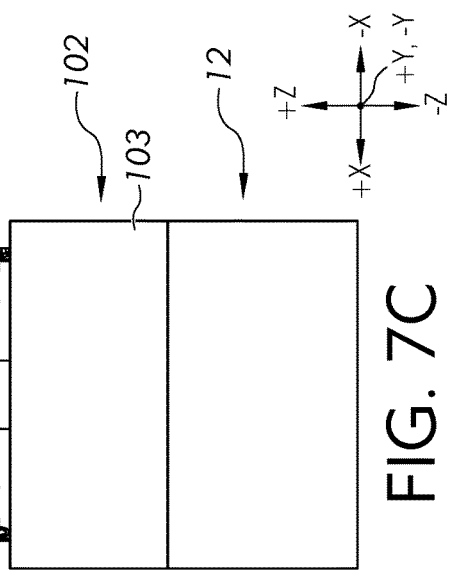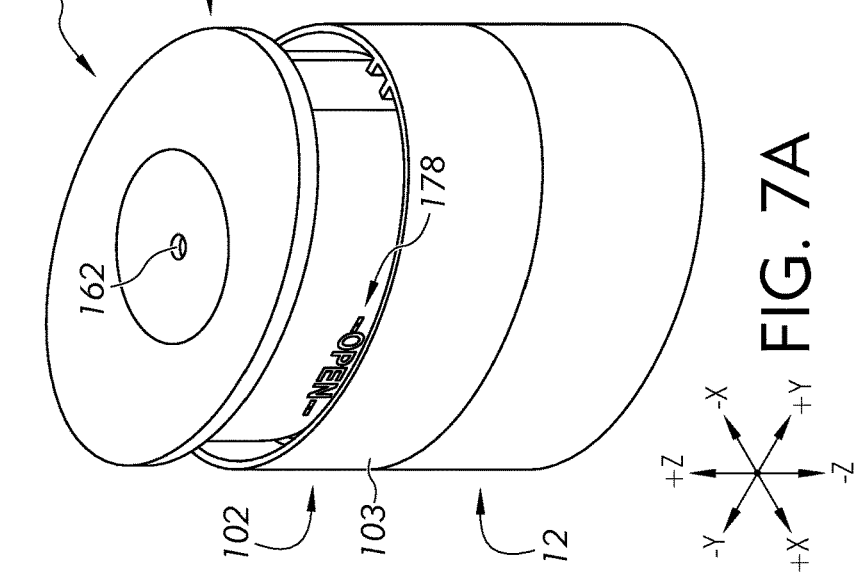

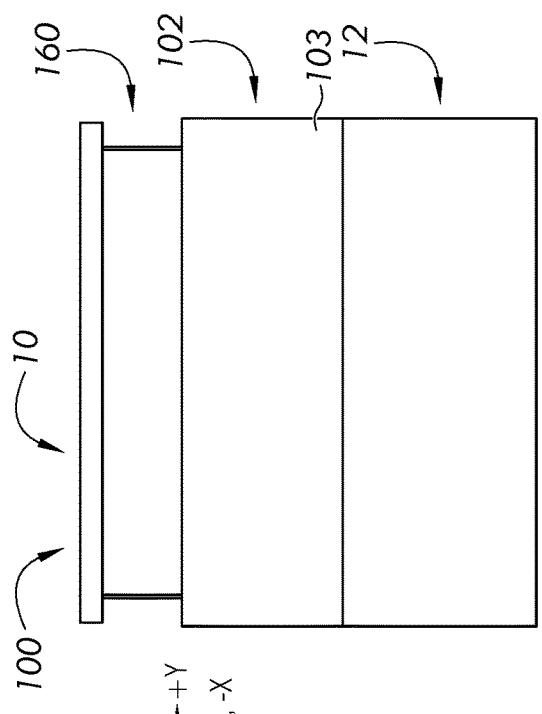
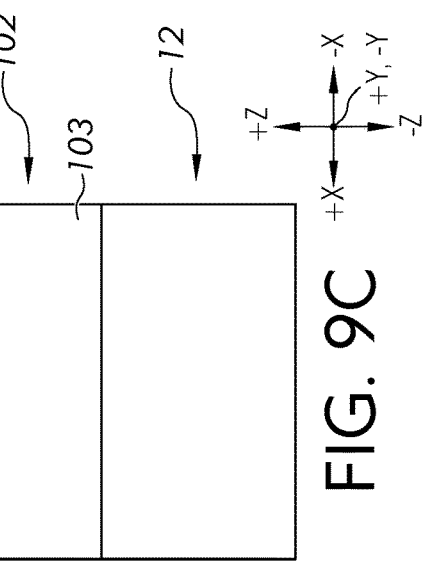
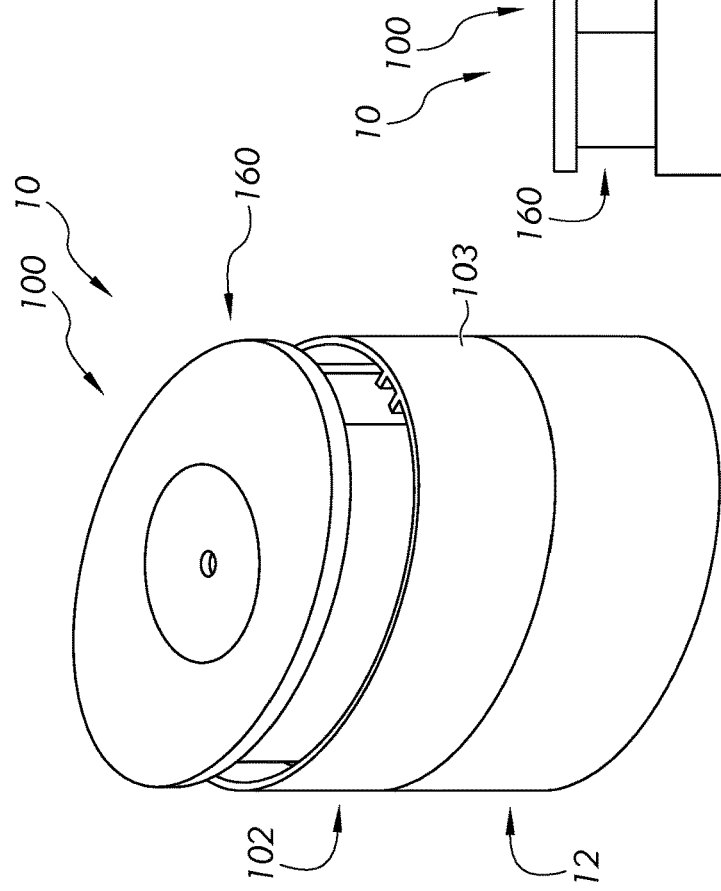
FIG. 9B
FIG. 9C
FIG. 9A

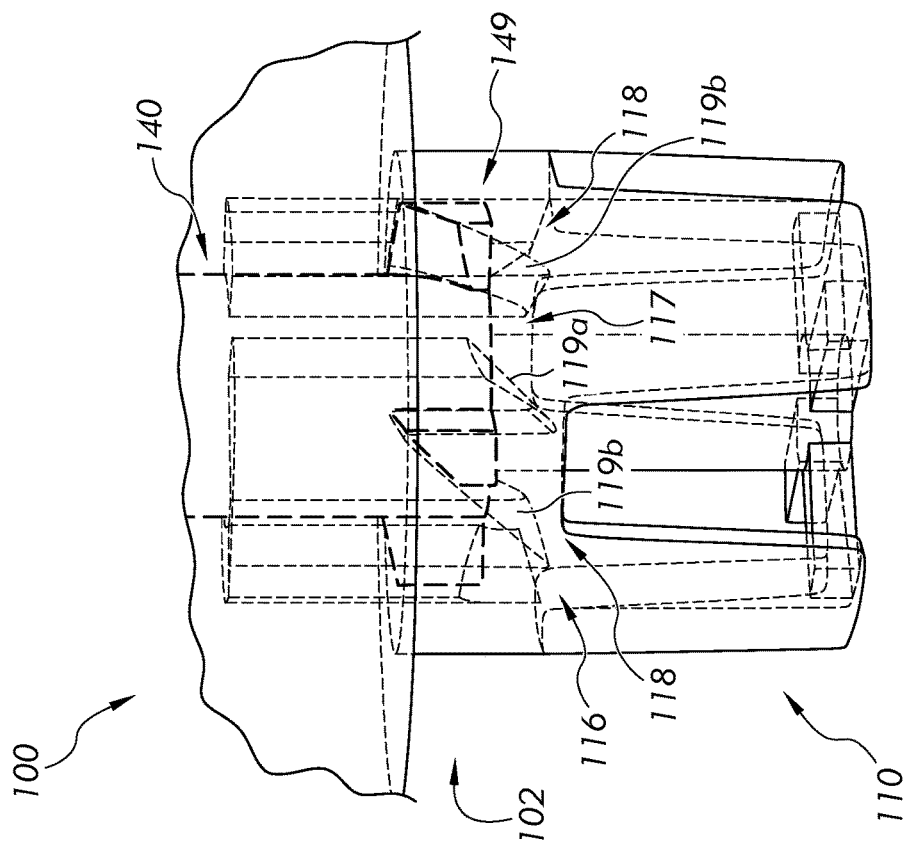
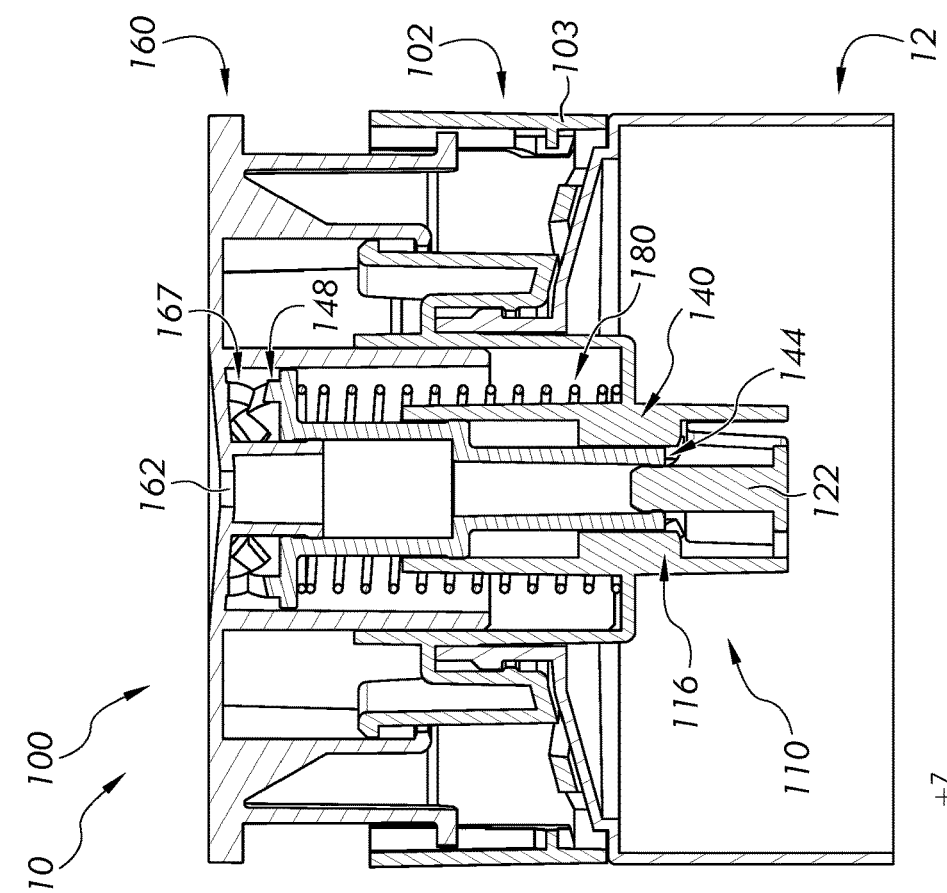
FIG. 9E
FIG. 9D

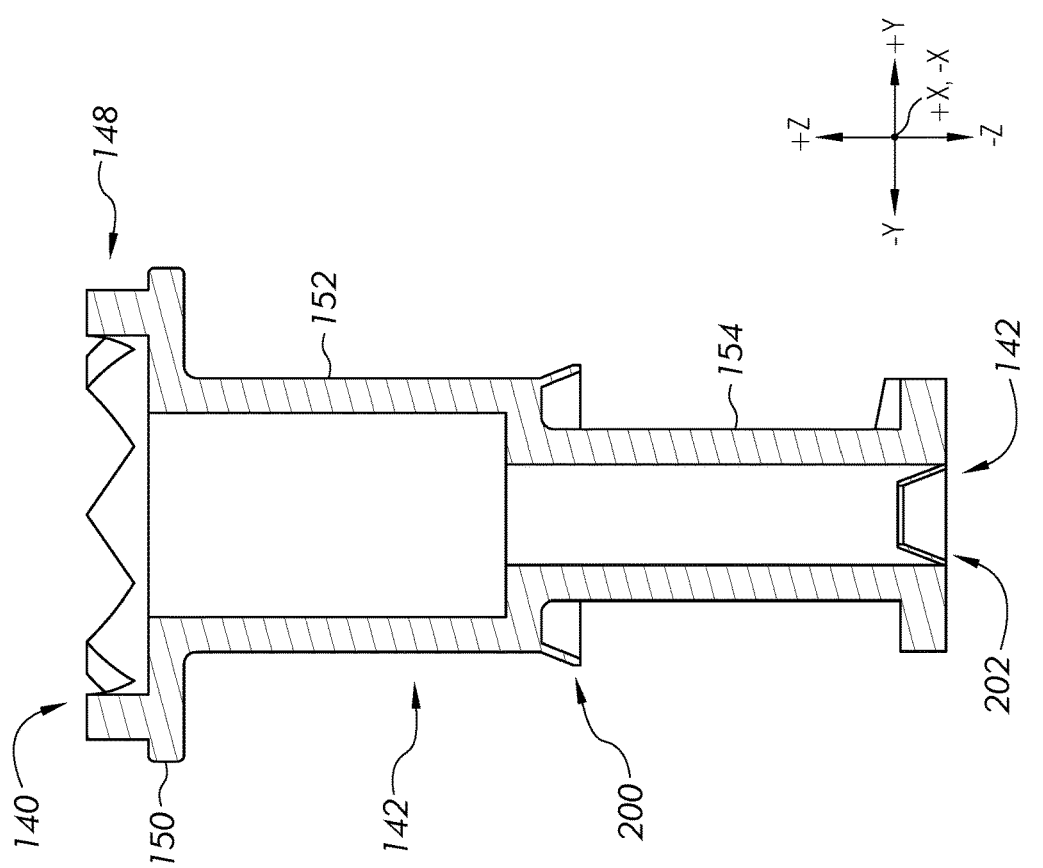
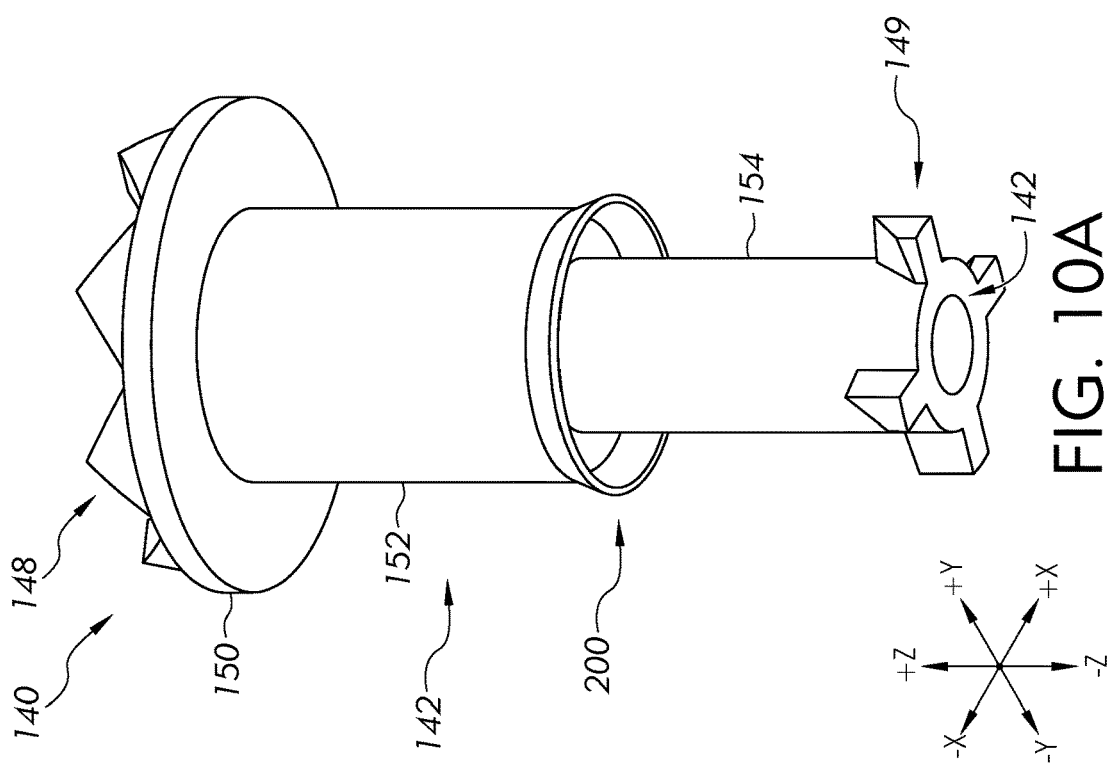
FIG. 10B
FIG. 10A

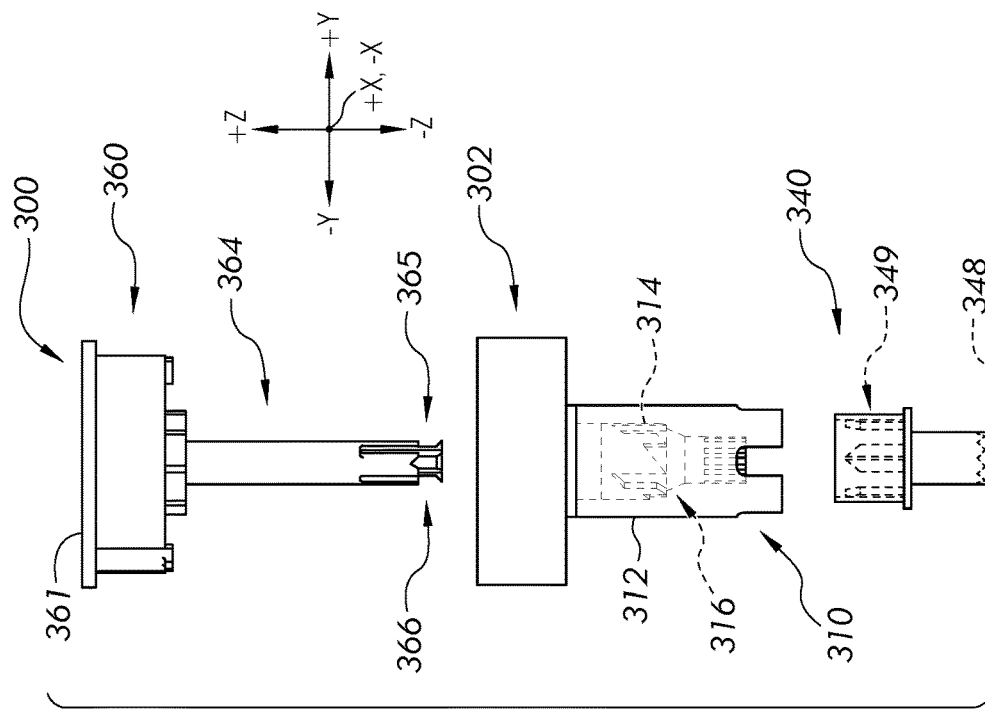
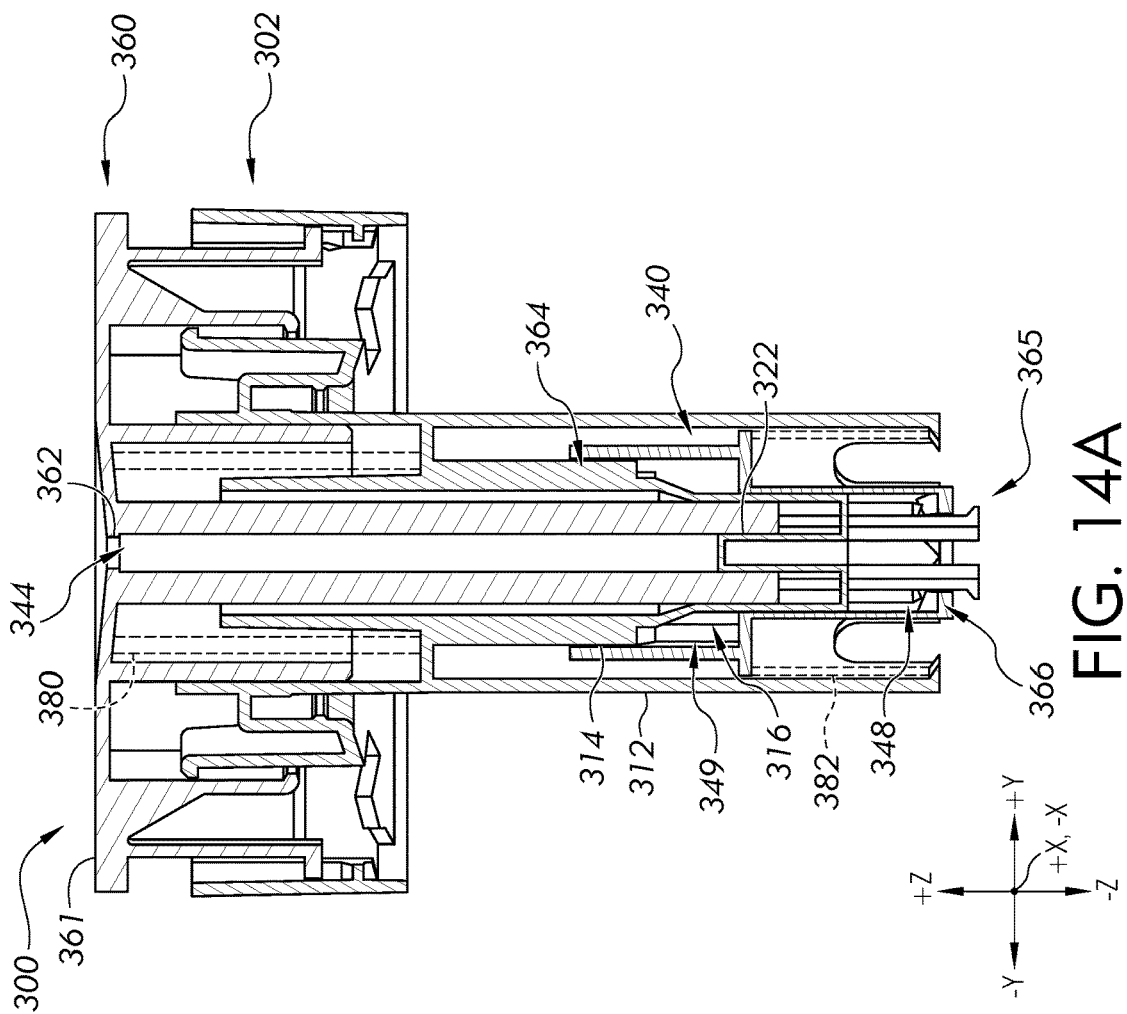
FIG. 14A
FIG. 14B

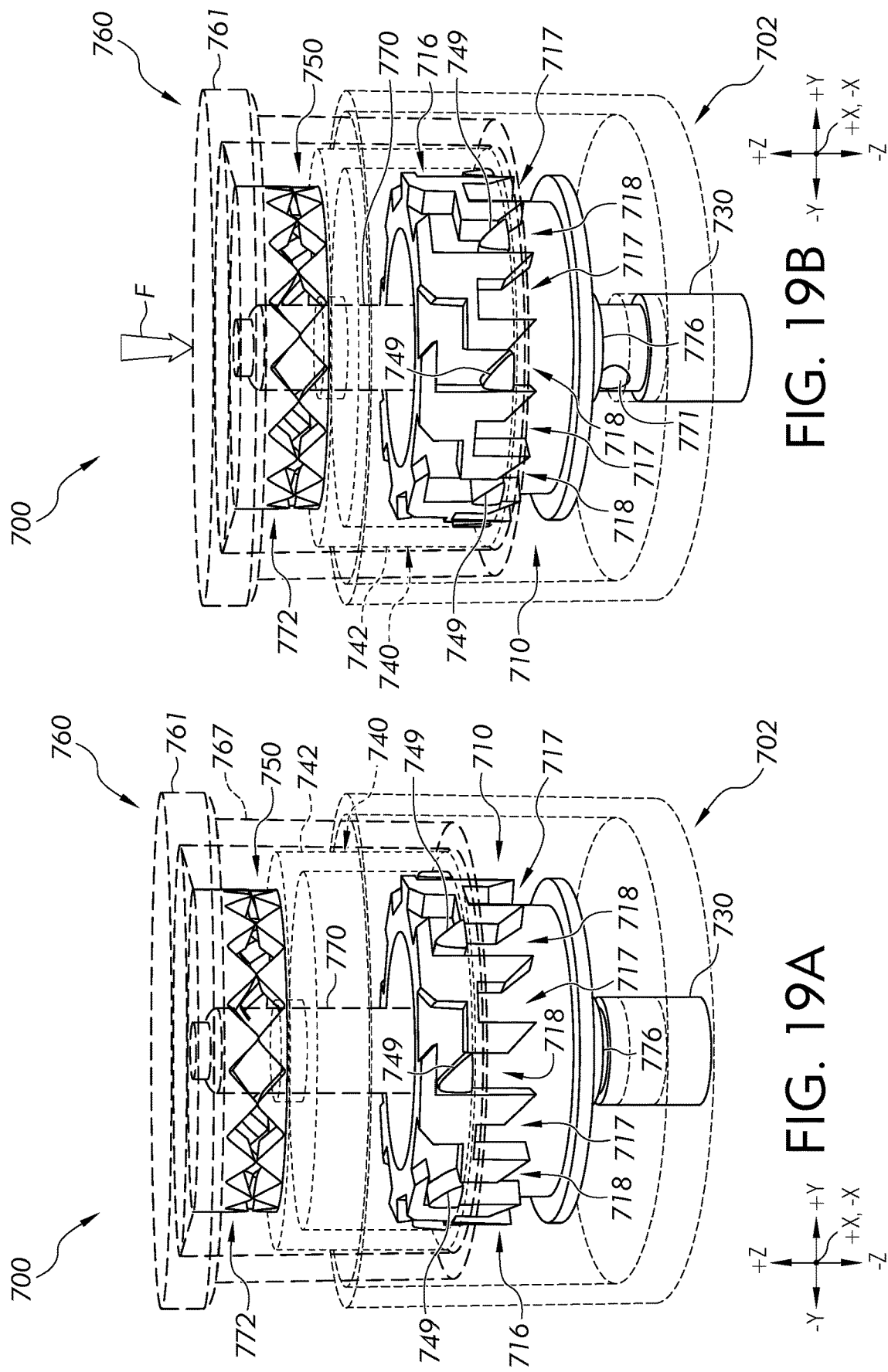

PRODUCT CONTAINERS AND CLOSURE ASSEMBLIES FOR PRODUCT CONTAINERS

CROSS-REFERENCE TO RELATED APPLICATION

The present application claims the benefit of U.S. Provisional Application No. 63/132,102, filed Dec. 30, 2020, the entirety of which is hereby incorporated by reference in its entirety.

TECHNICAL FIELD

The present specification generally relates to product containers and closure assemblies for product containers and, more specifically, product containers and closure assemblies for dispensing beauty care products.

BACKGROUND

When dispensing products, such as hair care products or other beauty care products, a product may be dispensed through a closure of the product container. Some containers may be designed to be stored upside down, such that the product container rests on its closure when not held by the user. Such containers may aid in preventing air from being aspirated into the product to ensure smooth product dispensing. However, to open the closure, users will often turn the product container over so the closure faces an upward direction, which causes product to flow back from the closure thereby allowing for potential aspiration of air, which may introduce air bubbles into the product, potentially impacting or interrupting the flow of product from the container. Furthermore, between uses, the user may lay the product on its side to prevent product from seeping out through the open closure, again allowing product to move away from the closure and increasing risk of air aspiration.

Accordingly, a need exists for alternative closure assemblies and product containers comprising the same that encourage a user to maintain the closure in a downward facing direction before, after, and throughout use.

SUMMARY

In one embodiment, a closure assembly includes a top, a base, and a follower. The top includes a user engagement portion defining a fluid orifice therethrough. The user engagement portion includes an outer surface, an inner surface opposite the outer surface, wherein the fluid orifice extends through the outer surface and the inner surface, and a plurality of top teeth extending from the inner surface and arranged around the fluid orifice. The base is coupled to the top, wherein the top is moveable relative to the base. The base includes a central hub defining a cam path having a plurality of opening slots and a plurality of closing slots. The follower is positioned between the top and the base and includes a plurality of top follower teeth engaged with the plurality of top teeth of the top and a plurality of base follower teeth disposed in the cam path of the base. The top and the follower are biased away from the base, and depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

In another embodiment, closure assembly includes a top, a base, and a follower. The top includes a user engagement portion defining a fluid orifice therethrough, the user engagement portion including an outer surface, an inner surface opposite the outer surface, wherein the fluid orifice extends through the outer surface and the inner surface, and a plurality of top teeth extending from the inner surface and arranged around the fluid orifice. The base is coupled to the top, wherein the top is moveable relative to the base. The base includes a central hub defining an cam path formed on an inner diameter of the central hub, the cam path having a plurality of opening slots and a plurality of closing slots. The follower is positioned within the central hub of the base and extends between the top and the base. The follower includes a plurality of top follower teeth engaged with the plurality of top teeth of the top and a plurality of base follower teeth disposed in the cam path of the base. The top and the follower are biased away from the base and depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

In yet another embodiment, A product container includes a container body and a closure assembly coupled to the container body. The closure assembly includes a base, a top, and a follower. The base is coupled to the container body and includes a cam path having a plurality of opening slots and a plurality of closing slots. The top is moveably coupled to the base and having a fluid orifice and a plurality of top teeth arranged circumferentially around the fluid orifice. The follower includes a plurality of top follower teeth engaged with the plurality of top teeth of the top and a plurality of base follower teeth disposed in the cam path of the base. Depression of the top relative to the base causes the follower to rotate relative to the top between an open position in which the plurality of base follower teeth are positioned within the plurality of opening slots and a fluid flow path extending from the container body to the fluid orifice is opened and a closed position in which the plurality of base follower teeth are positioned within the plurality of closing slots and the fluid flow path is closed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A depicts a follower of the closure assembly of FIG. 1A, according to one or more embodiments shown and described herein;

FIG. 4B depicts a bottom view of the follower of FIG. 4A, according to one or more embodiments shown and described herein;

FIG. 5A depicts a perspective view of a top of the closure assembly of FIG. 1A, according to one or more embodiments shown and described herein;

FIG. 5B depicts a front view of the top of FIG. 5A, according to one or more embodiments shown and described herein;

FIG. 5C depicts a side view of the top of FIG. 5A, according to one or more embodiments shown and described herein;

FIG. 5D depicts a bottom perspective view of the top of FIG. 5A, according to one or more embodiments shown and described herein;

FIG. 7A depicts a perspective view of the closure assembly of FIG. 1A in an open configuration, according to one or more embodiments shown and described herein;

FIG. 7B depicts a front view of the closure assembly of FIG. 7A, according to one or more embodiments shown and described herein;

FIG. 7C depicts a side view of the closure assembly of FIG. 7A, according to one or more embodiments shown and described herein;

FIG. 9A depicts a perspective view of the closure assembly of FIG. 1A in a closed, non-shipping, configuration, according to one or more embodiments shown and described herein;

FIG. 9B depicts a front view of the closure assembly of FIG. 9A, according to one or more embodiments shown and described herein;

FIG. 9C depicts a side view of the closure assembly of FIG. 9A, according to one or more embodiments shown and described herein;

FIG. 9D depicts a cross-sectional view of the closure assembly of FIG. 9A, according to one or more embodiments shown and described herein;

FIG. 9E depicts the follower positioned within a closing slot of a cam path formed in the base (shown as transparent) of the closure assembly of FIG. 9A, according to one or more embodiments shown and described herein;

FIG. 10A depicts a follower for use with a closure assembly, according to one or more embodiments shown and described herein;

FIG. 10B depicts a cross section of the follower of FIG. 10A, according to one or more embodiments shown and described herein;

FIG. 14A depicts a cross-section of another closure assembly, according to one or more embodiments shown and described herein;

FIG. 14B depicts an exploded view of the closure assembly of FIG. 14A, according to one or more embodiments shown and described herein;

FIG. 19A depicts the closure assembly of FIG. 18 in a closed position, according to one or more embodiments shown and described herein;

FIG. 19B depicts a top and follower of the closure assembly of FIG. 19A moving vertically toward a base of the closure assembly, according to one or more embodiments shown and described herein;

DETAILED DESCRIPTION

The present disclosure is directed to product containers and closure (or lid) assemblies which provide for an improved user experience in dispensing products. For example, embodiments of the present disclosure may be operated by a user so as to encourage the user to maintain the closure in a downward facing direction before, after, and throughout use to reduce risk for aspiration of air into the product container. In some embodiments, closure assemblies as disclosed herein may provide tactile and/or auditory feedback for indicating whether a fluid orifice is sealed or open to allow product to flow therethrough. Closure assemblies according to embodiments of the present disclosure generally include a top, a base, and a follower. The follower may rotate and/or travel between an open position and a closed position which respectively open and close a fluid path to a fluid orifice formed within the top via pressing on the top. Each time a user depresses the top, the follower rotates and contacts at least one of the top and the base, which may cause a tactile and/or auditory response, indicating to the user that the fluid path is opened or closed. As the closure assembly is operated via pressing the top, a user can easily maintain the product container in a substantially vertical orientation with the closure assembly facing in a downward direction, thereby encouraging product to remain at the closure assembly and discourage aspiration of air into the product container. Embodiments of the present disclosure may be ergonomically configured for single handed use, as opposed to two handed use needed for many flip-top arrangements. For example, a user may grasp the product container and press the closure assembly against a surface to open and/or close the product container. Accordingly, the embodiments of the present disclosure may be particularly advantageous for use by individuals with disabilities or conditions which may restrict hand use. Various embodiments of product containers and closure assemblies will be described in greater detail herein.

It is noted that directional identifiers such as bottom, top, above, below, etc., refer to either named components, irrespective of orientation, and/or generally refer to positioning within the depicted coordinate axes of a figure. As such, one of skill should understand that the directional identifiers are non-limiting and are used for convenience of description, unless otherwise expressly stated.

Figure 1B:
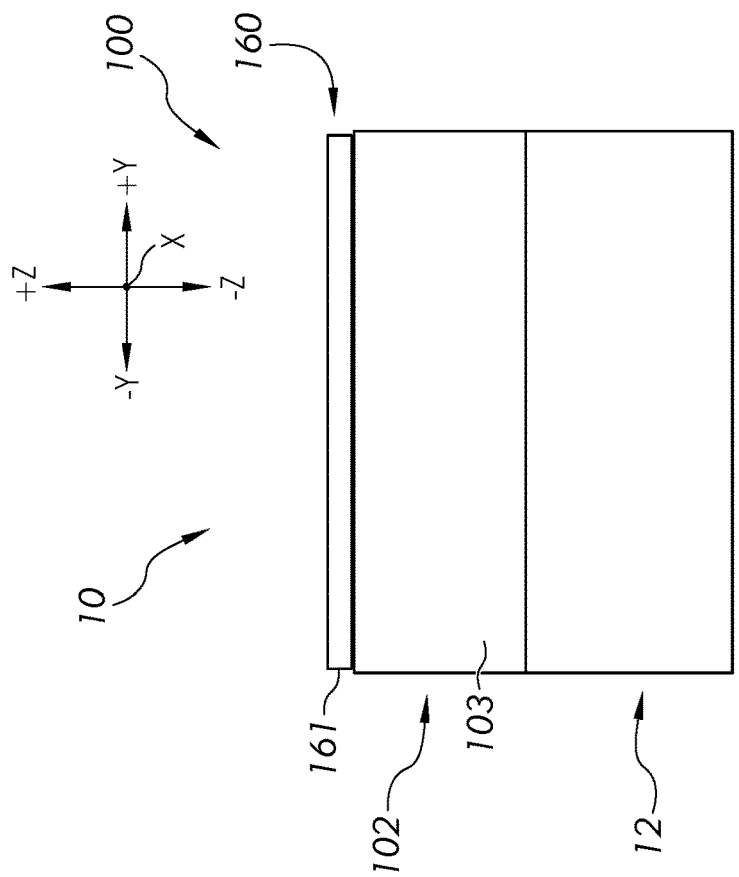
FIG. 1B depicts a front view of the product container of FIG. 1A, according to one or more embodiments shown and described herein.
Figure 1A:
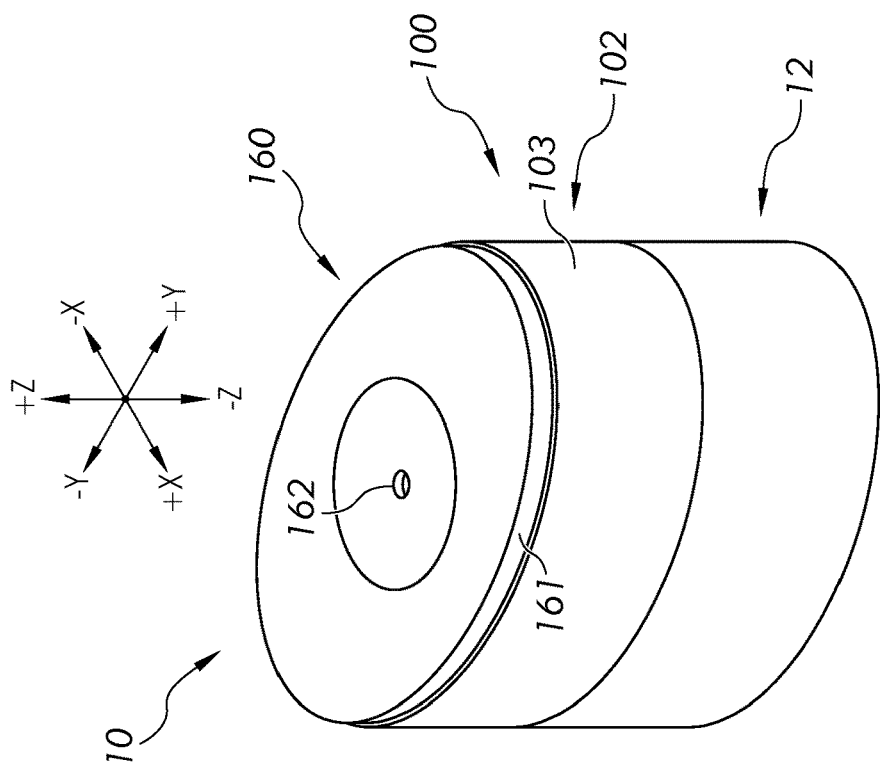
FIG. 1A depicts a perspective view of a product container including a closure assembly in a ship-locked orientation, according to one or more embodiments shown and described herein.
Figure 1C:
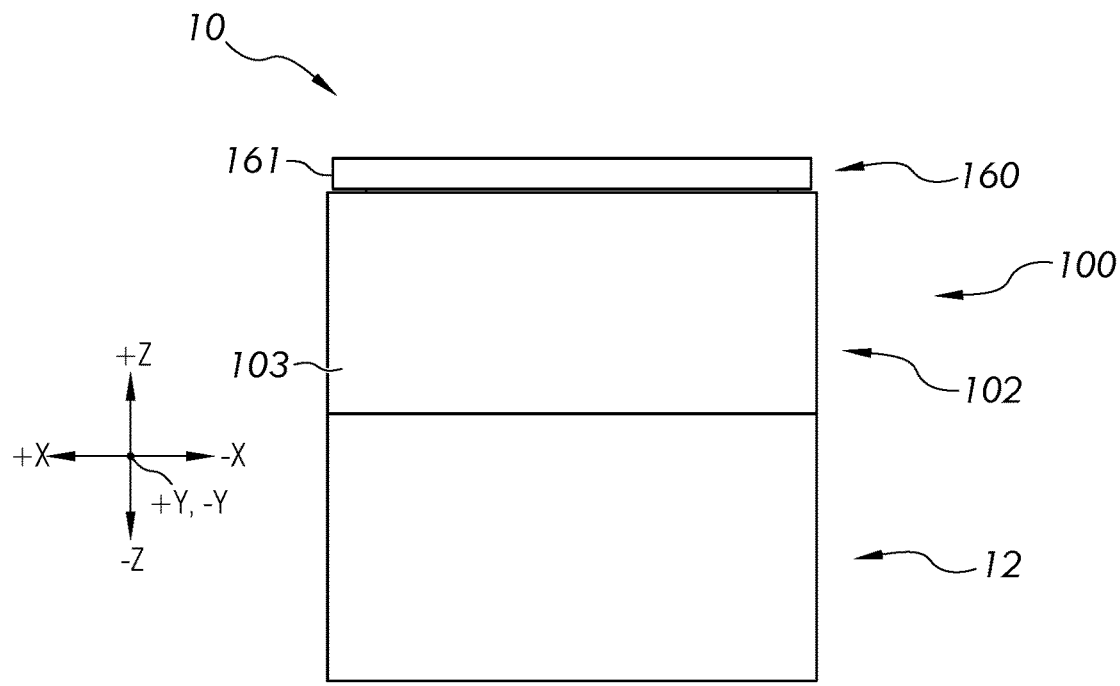
FIG. 1C depicts a side view of the product container of FIG. 1A, according to one or more embodiments shown and described herein.
Figure 1D:
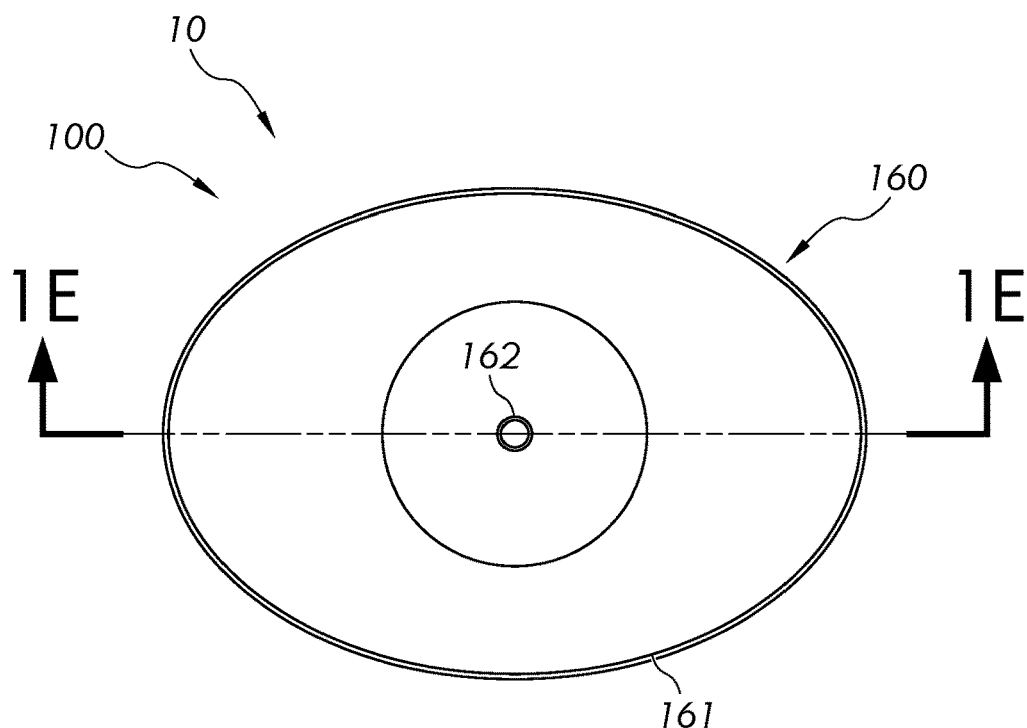
FIG. 1D depicts a top view of the product container of FIG. 1A, according to one or more embodiments shown and described herein.
Figure 1E:
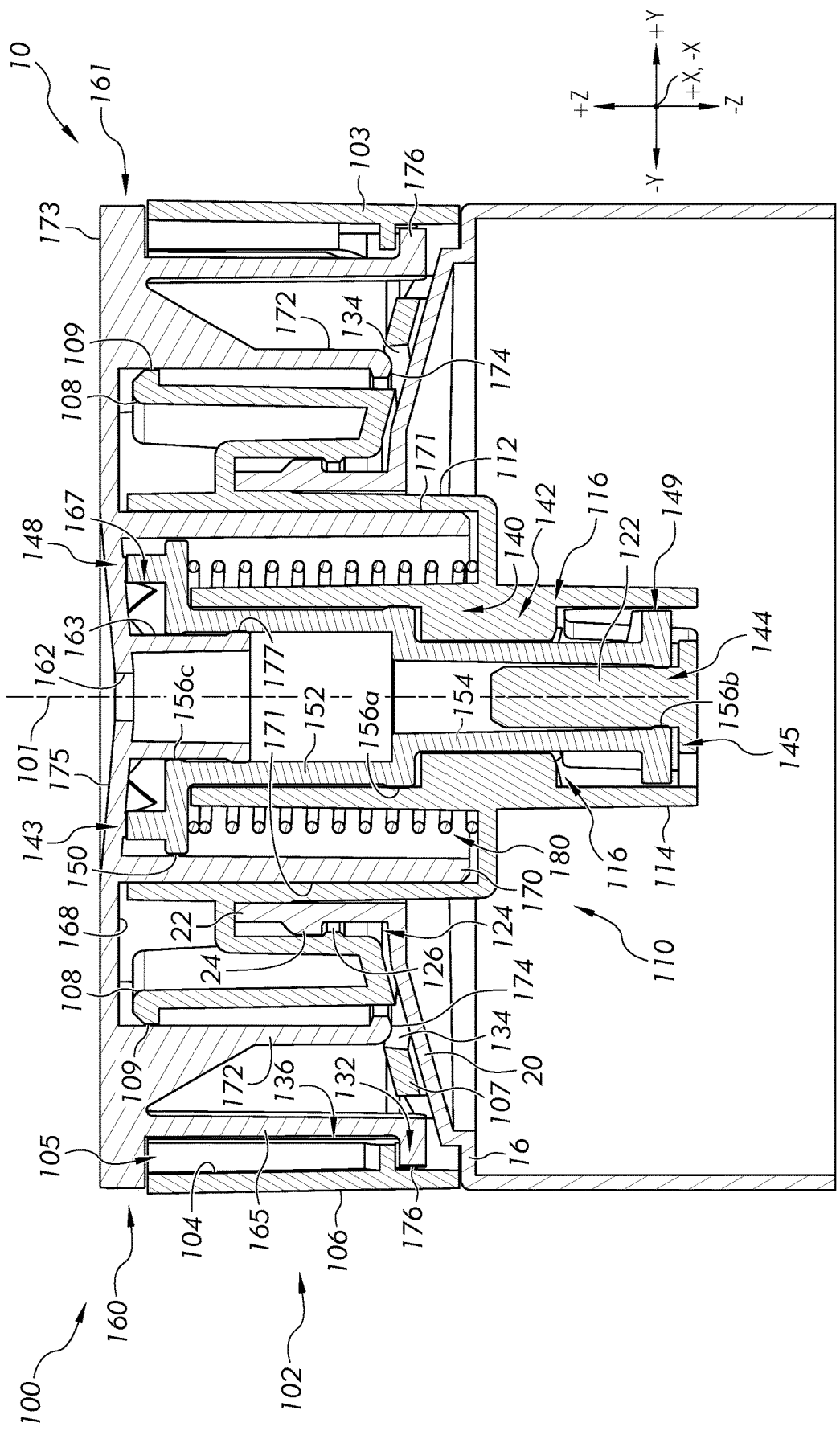
FIG. 1E depicts a cross-section taken along line 1E-1E of FIG. 1A, according to one or more embodiments shown and described herein

Referring now to FIGS. 1A-1E, a product container 10 is generally depicted. FIG. 1A depicts a perspective view of the product container 10, FIG. 1B, depicts a front view of the product container 10, FIG. 1C depicts a side view of the product container 10, FIG. 1D depicts a top view of the product container 10, FIG. 1E depicts a cross-sectional view of the product container 10 taken along lines 1E-1E of FIG. 1D. As used herein "product containers" may refer to any type of container which may be used to store and dispense consumer products. In particular, embodiments of the present disclosure are directed to product containers for beauty products (e.g., products directed to skincare, haircare, or the like). Beauty care products may include, but are not limited to, creams, lotions, gels, shampoos, conditioners, serums, etc. The product container 10 may generally include a container body 12 and a closure assembly 100 mounted to the container body 12. It is noted that while the product container 10 is depicted with the closure assembly 100 positioned above the container body 12 in the +Z direction of the depicted coordinate axes, in embodiments, the closure assembly 100 may be oriented below, i.e., in the –Z direction of the depicted coordinate axis, the container body 12 such that the container body 12 is positioned above the closure assembly 100 and product within the container body 12 naturally flows (e.g., due to gravity) toward the closure assembly 100. It is further noted that the product container 10, illustrated in FIGS. 1A-1E, is in a ship-locked configuration for preventing inadvertent opening of the product container 10 during shipping or travel. As will be described in greater detail herein, user interaction with the closure assembly 100 may transition the product container 10 between various configurations including a ship-locked configuration, an open configuration (see FIGS. 7A-7E), and/or a closed configuration (see FIGS. 9A-9E).

The container body 12 may include any type of bottle, tube, or combination thereof (e.g., "tottle"). The container body 12 may generally be formed of one or more polymers such as polyolefin (e.g., low density polyethylene, high density polyethylene, polypropylene, polystyrene, polyvinyl chloride, polycarbonate, etc., or any combination thereof), polyester (e.g., polyethylene terephthalate, polybutylene terephthalate, etc., or any combination thereof), or any combination thereof.

Figure 2:
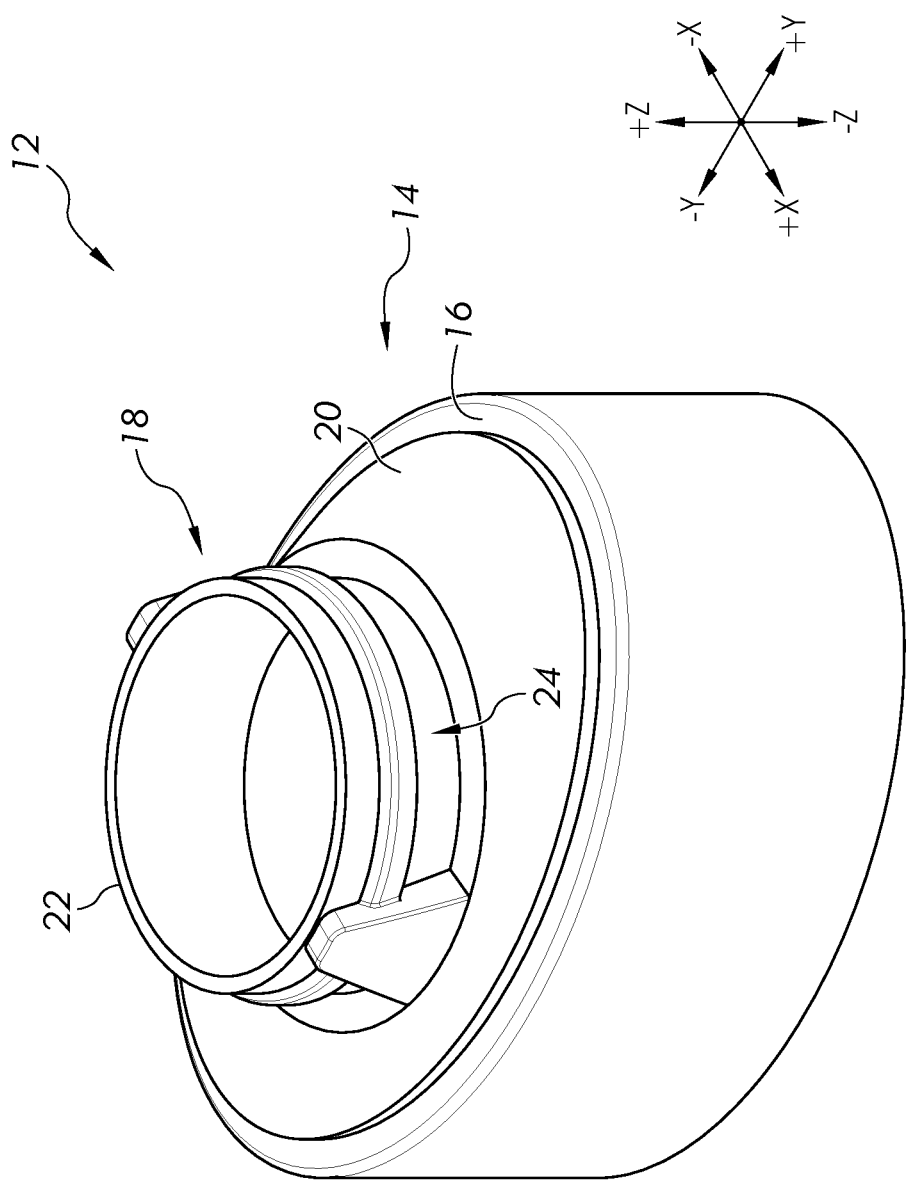
FIG. 2 depicts a perspective view of a container body of the product container of FIG. 1A, according to one or more embodiments shown and described herein.

Referring to FIG. 2, the container body 12 is depicted in isolation from the closure assembly 100 (depicted in FIGS. 1A-1E). The container body 12 may comprise a mounting end 14 to which the closure assembly 100 may be mounted. For example, the mounting end 14 may include a mounting platform 16 and a mounting protrusion 18 extending from the mounting platform 16. For example, the mounting platform 16 may be generally planar and extend around a perimeter of the mounting end 14. The mounting protrusion 18 may include a support portion 20, which may be stepped radially inward from an outer perimeter of the container body 12 via the mounting platform 16 of the container body 12. The support portion 20 may, as illustrated in the indicated embodiment, slope at some non-oblique angle in the +Z direction of the depicted coordinate axes to a bottle neck 22. In other embodiments, the support portion 20 may be parallel to the XY plane of the depicted coordinate axes or parallel to the Z axis of the depicted coordinate axes. The bottle neck 22 may include one or more retention features 24 configured to mount the closure assembly 100 thereto. Such retention features 24 may include any combination of threads, ribs, protrusions, or the like. The support portion 20 may direct product (not shown) to the bottle neck 22 for dispensing product through the closure assembly 100 (depicted in FIGS. 1A-1E).

Referring again to FIGS. 1A and 1E, the closure assembly 100 includes a base 102, a follower 140, and a top 160. As will be further described in further detail herein, the top 160 may be moveably coupled to the base 102. Movement of the top 160 relative to the base 102 (e.g., in the +/−Z direction of the depicted coordinate axes) causes the follower 140 to rotate about and/or translate along a rotation axis 101 between a closed position and an open position to open and/or close a fluid flow path 144 (depicted in FIG. 1E) to a fluid orifice 162 formed within the top 160. In the open position, fluid or product within the container body 12 may flow along the fluid flow path 144 through the closure assembly 100 and out the fluid orifice 162. As further illustrated in FIG. 1E, a biasing element 180, such as a spring, may be included to bias at least one of the top 160 and/or the follower 140 away from the base 102. However, in some embodiments, the biasing element 180 may instead be integral to, such as integrally molded with, one of the base 102, the follower 140, and/or the top 160.

The base 102 couples the closure assembly 100 to the container body 12, as depicted in FIGS. 1A and 1E. Referring now to FIGS. 3A-3G, the base 102 is illustrated in isolation to further depict various features of the depicted embodiment of the base 102. The base 102 may be formed through any conventional manufacturing methods such as injection molding or the like and may be formed from one or more polymers such as polyolefin (e.g., low density polyethylene, high density polyethylene, polypropylene, polystyrene, polyvinyl chloride, polycarbonate, etc., or any combination thereof), polyester (e.g., polyethylene terephthalate, polybutylene terephthalate, etc., or any combination thereof), or any combination thereof. The base 102 generally comprises a body 103, which may include an outer peripheral wall 106, a, central hub 110, and one or more retaining flanges 108.

Figure 3A:
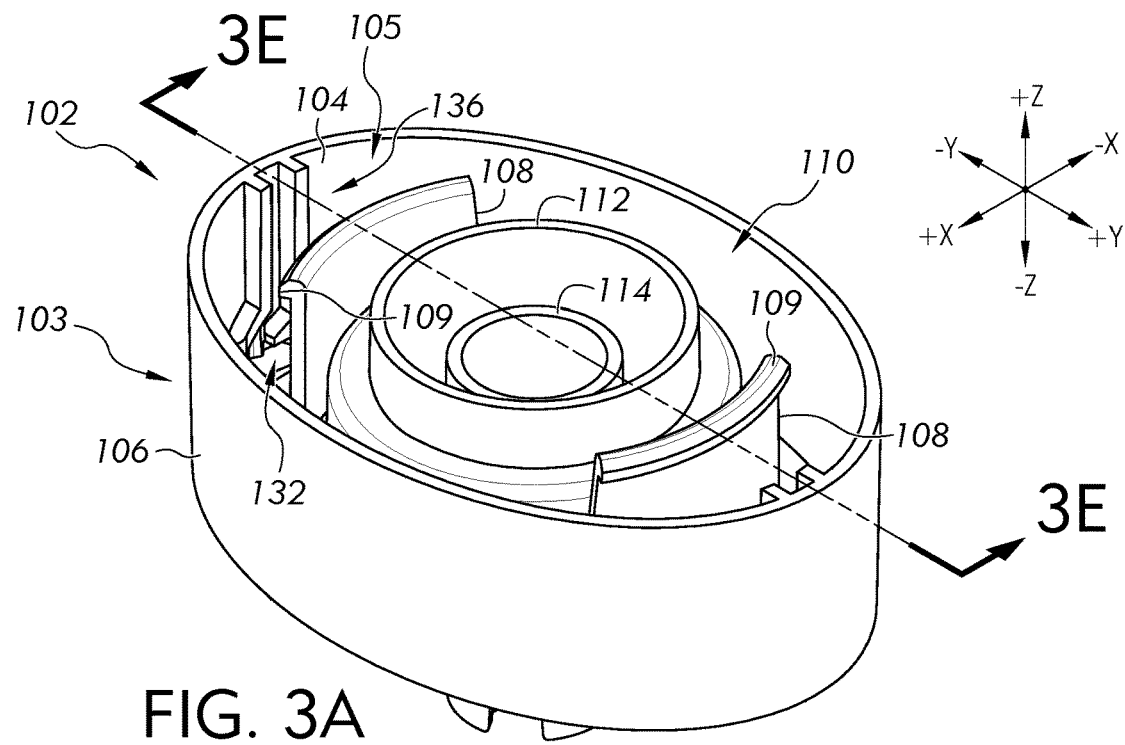
FIG. 3A depicts a front perspective view of a base of the closure assembly of FIG. 1A, according to one or more embodiments shown and described herein.
Figure 3B:
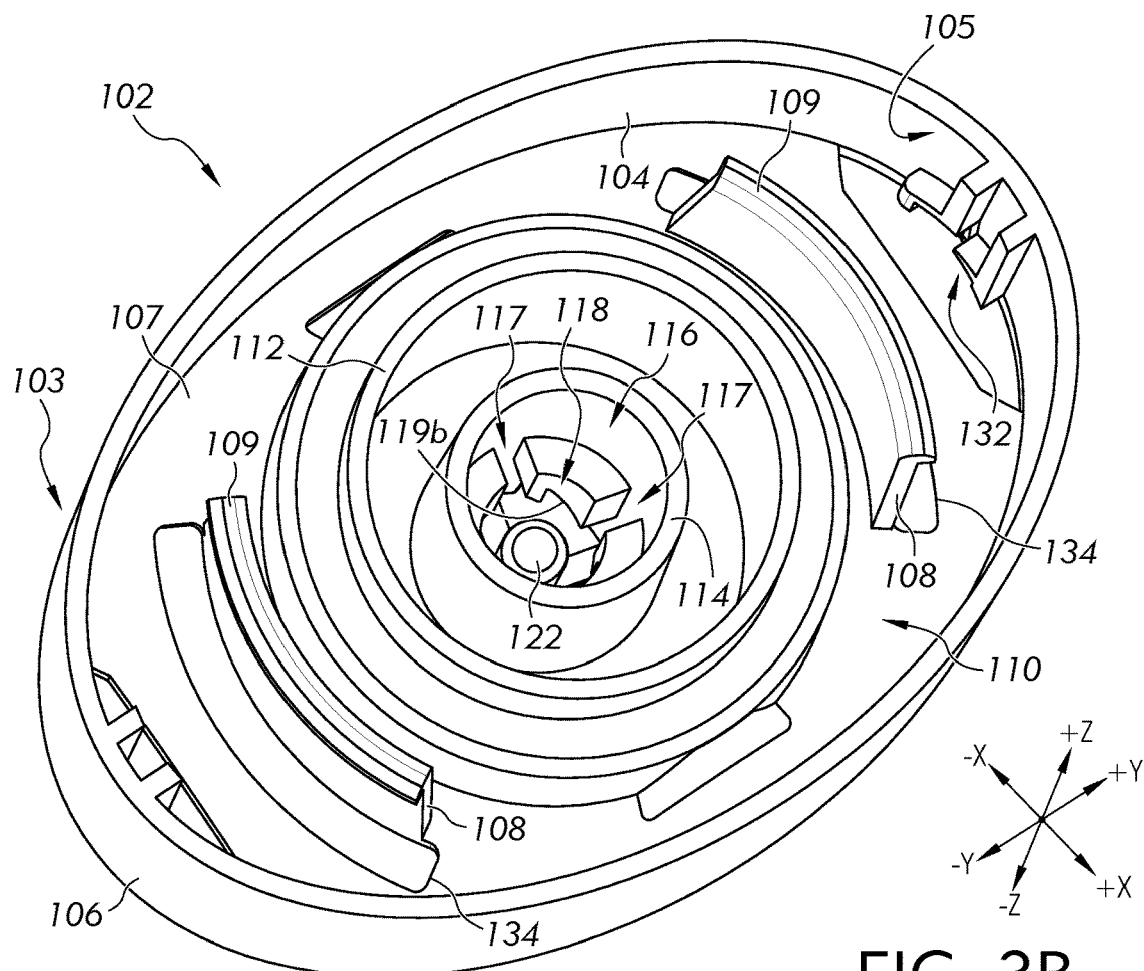
FIG. 3B depicts a top perspective view of the base of FIG. 3A, according to one or more embodiments shown and described herein.
Figure 3C:
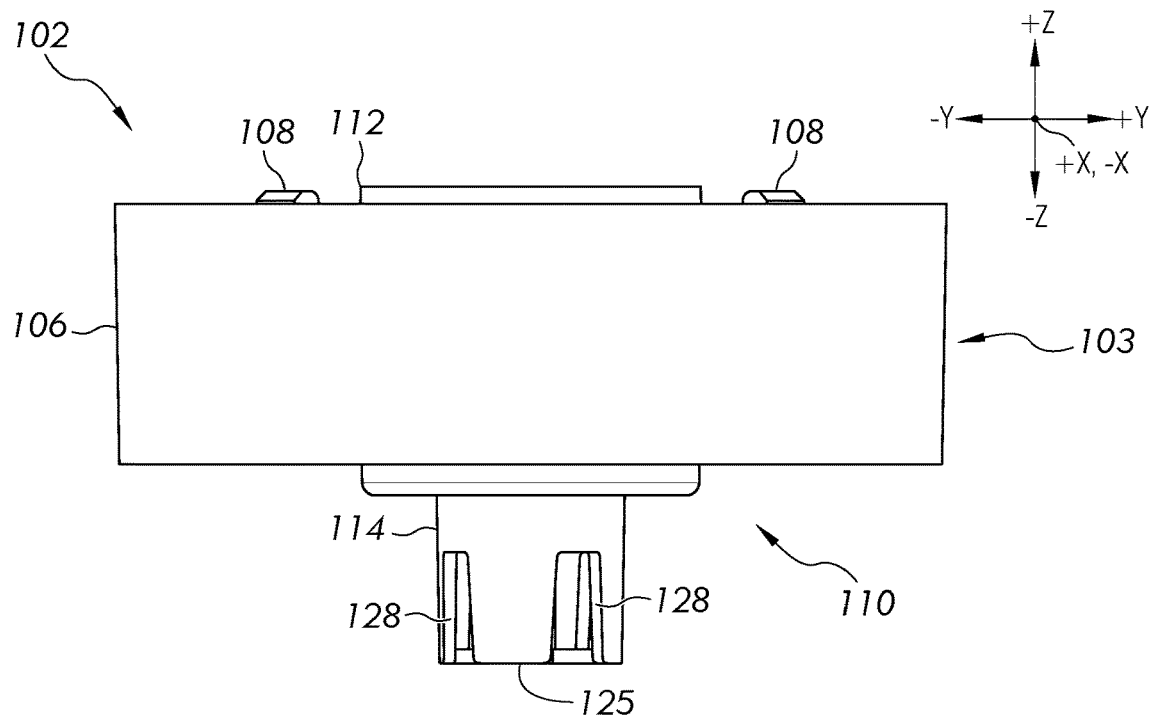
FIG. 3C depicts a front view of the base of FIG. 3A, according to one or more embodiments shown and described herein.
Figure 3D:
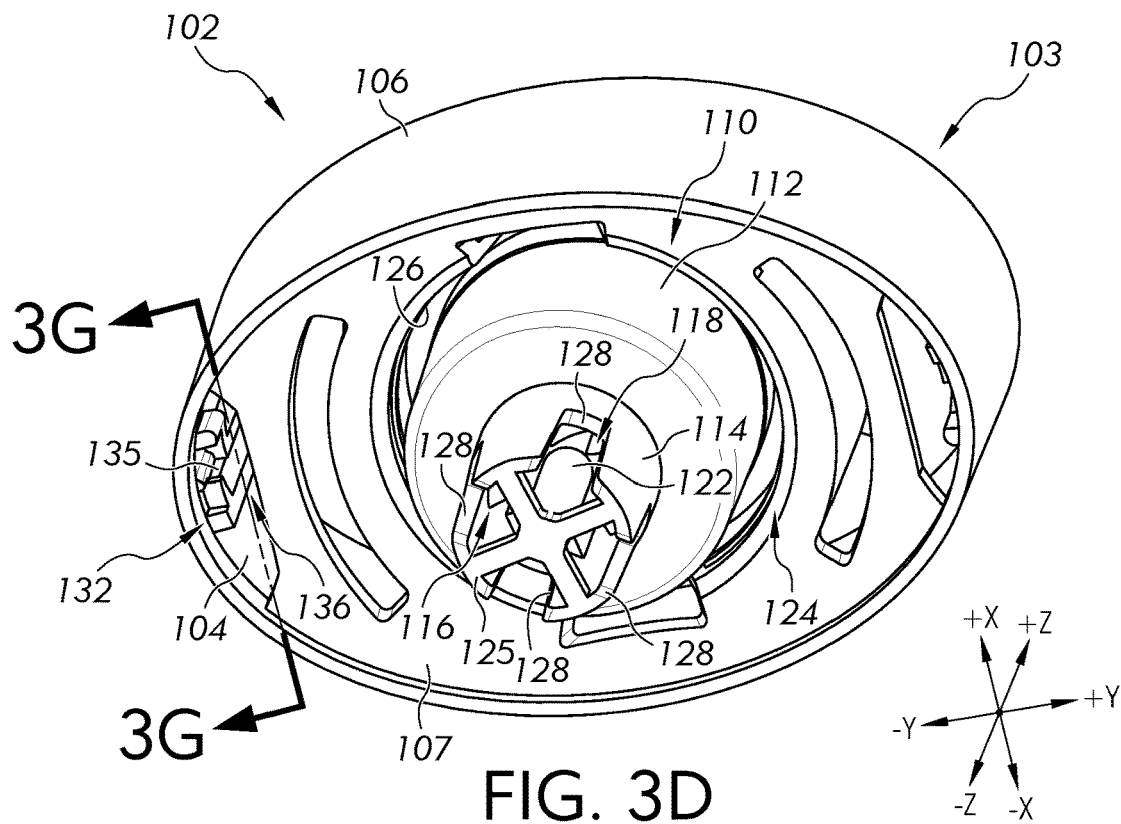
FIG. 3D depicts a bottom perspective view of the base of FIG. 3A, according to one or more embodiments shown and described herein.
Figure 3E:
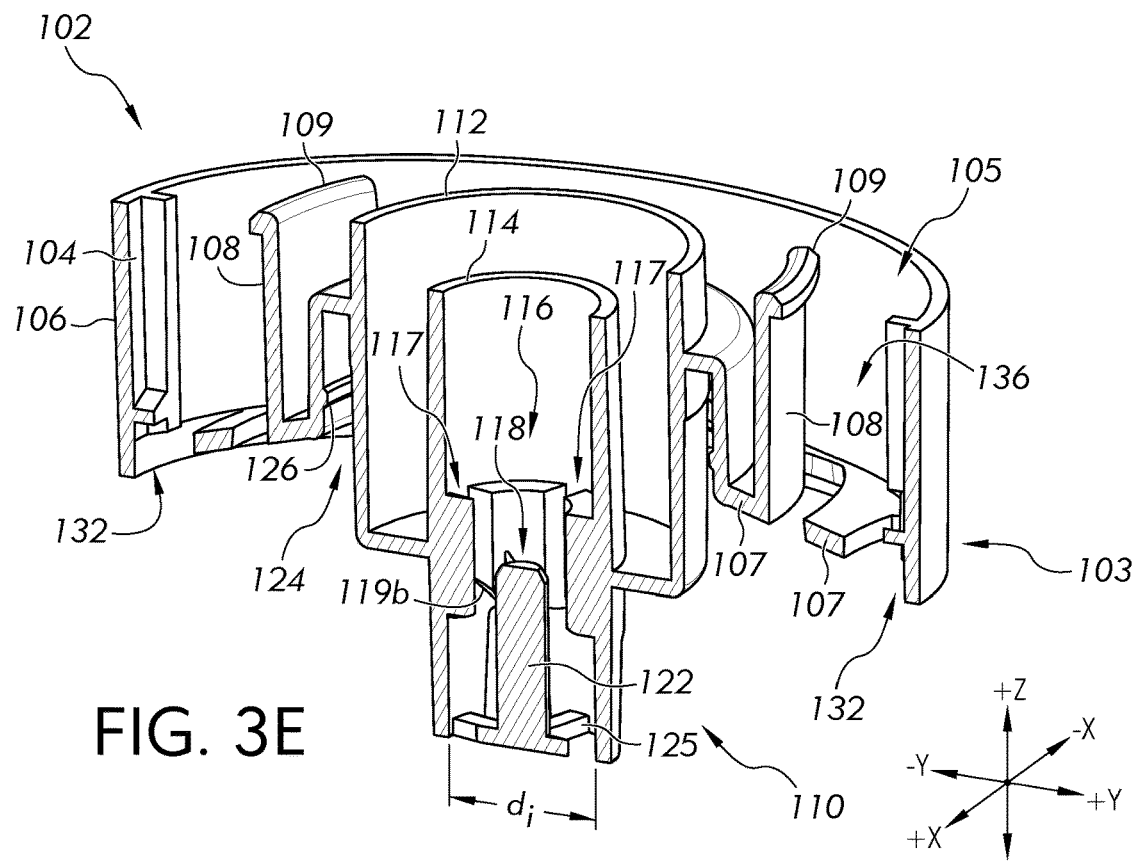
FIG. 3E depicts a perspective cross-section taken along lines 3E-3E of FIG. 3A, according to one or more embodiments shown and described herein.
Figure 3F:
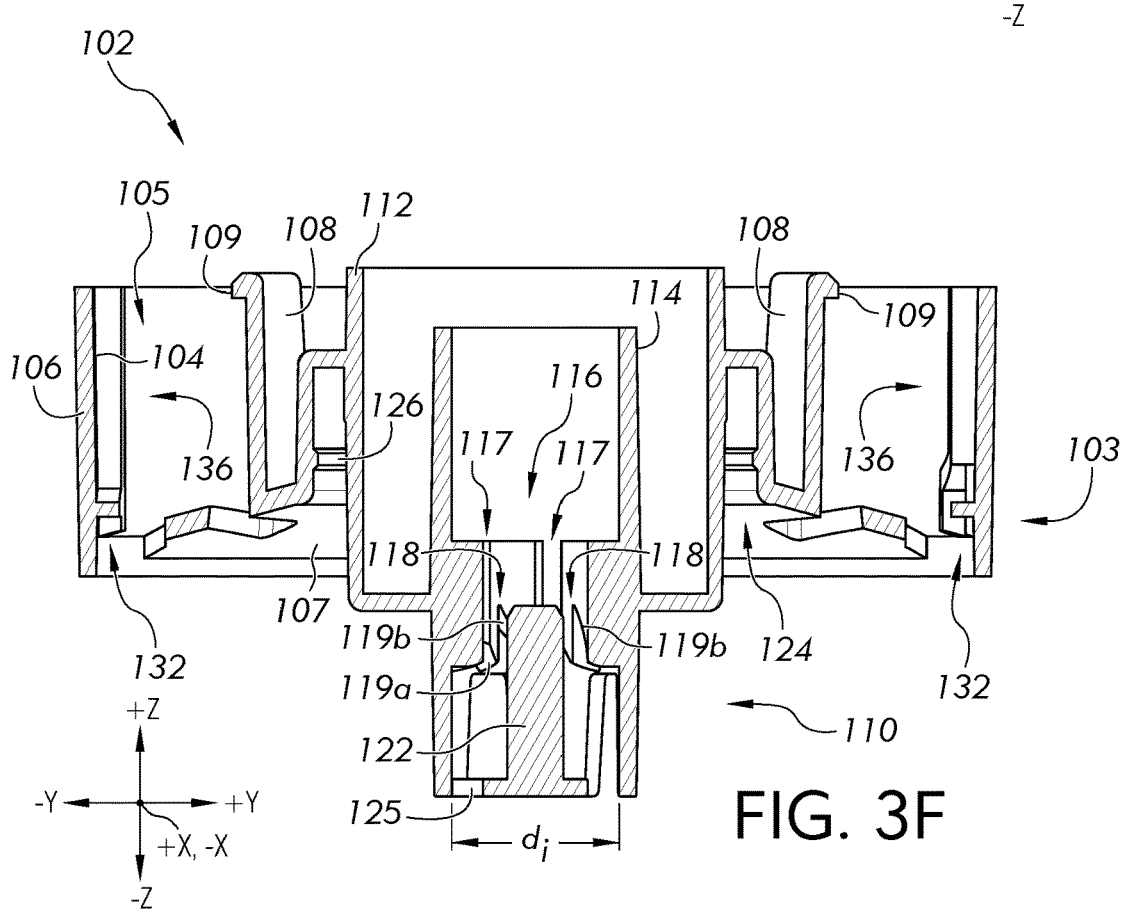
FIG. 3F depicts a front view of the cross-section of FIG. 3E, according to one or more embodiments shown and described herein.
Figure 3G:
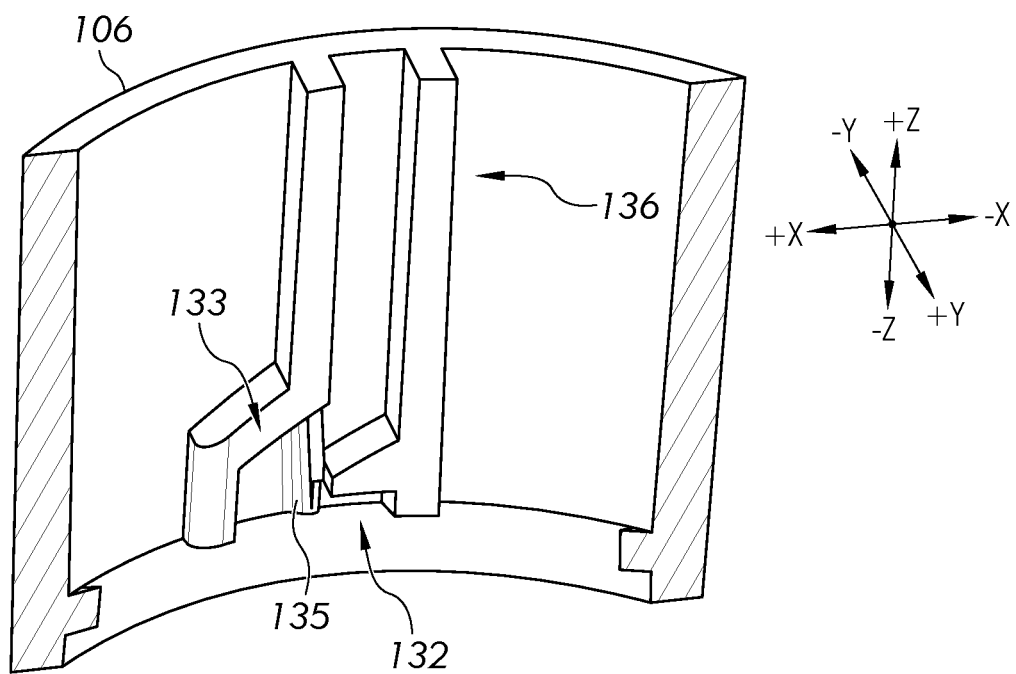
FIG. 3G depicts a locking slot of the base of FIG. 3A for placing the closure assembly of FIG. 1A in the ship-locked configuration, according to one or more embodiments shown and described herein.

The outer peripheral wall 106 generally defines the outer perimeter of the base 102. In embodiments, the outer perimeter may be oval-shaped, as depicted, circular, rectangular, or any other regular or irregular polygonal or non-polygonal shape. The outer peripheral wall 106 may generally define a top receiving volume 105 for receiving the top 160. One or more locking slots 132 may be formed on an interior surface 104 of the outer peripheral wall 106. The locking slots 132 may fix the position of the top 160 relative to the base 102. For example, one or more alignment channels 136 may be formed on the interior surface 104 of the outer peripheral wall 106. As illustrated in FIG. 3G specifically, the one or more locking slots 132 may extend laterally from the one or more alignment channels 136. For example, the one or more locking slots 132 may be positioned at a bottom of the one or more alignment channels 136 in the −Z direction of the depicted coordinate axes and extend laterally from the one or more alignment channels 136 in the +X direction of the depicted coordinate axes. A transition region 133 may be provided to provide a guide from the alignment channel 136 to the locking slot 132. In embodiments the transition region 133 may include one or more ribs 135 or other surface irregularity which may provide increased resistance between motion from and/or to a ship-locked configuration which may provide greater security in maintaining a ship-locked configuration, as will be described in greater detail below.

Referring collectively to FIGS. 3A-3F, positioned radially inward from the outer peripheral wall 106 is the central hub 110. A connecting wall 107 may extend between and connect the outer peripheral wall 106 with the central hub 110. The connecting wall 107 may define a bottle neck-receiving orifice 124 (depicted in FIGS. 3D-3F), which may include one or more mating retention features 126 (e.g., threads, ribs, protrusions, or the like) sized and shaped to mate with the retention features 24 of the bottle neck 22 when the bottle neck 22 is positioned within the bottle neck-receiving orifice 124, as depicted in FIG. 1E.

Still referring to FIG. 3A-3F, the central hub 110 defines a cam path 116. As will be described in greater detail herein, the cam path 116 is shaped to guide the follower 140 between the open position and the closed position described above. For example, the cam path 116 may include a plurality of opening slots 117 corresponding to the open position and a plurality of closing slots 118 corresponding to the closed position.

In embodiments, the central hub 110 may include an outer hub wall 112 and an inner hub wall 114 concentrically positioned within the outer hub wall 112. A spacing between the inner hub wall 114 and the outer hub wall 112 may be sized and shaped to receive, for example, a portion of the top 160 and/or the biasing element 180 (depicted in FIG. 1E). FIGS. 3E and 3F depict a cross-section of the base 102 taken along line 3E-3E of FIG. 3A. In the illustrated embodiment, the inner hub wall 114 has an inner diameter, and the cam path 116 is circumferentially formed on the inner diameter, di. In the depicted embodiment, the opening slots 117 may be longer than the closing slots 118 along the +/−Z direction of the depicted coordinate axes. Each of the opening slots 117 and the closing slots 118 may include leading angled surfaces 119a, 119b, respectively, which guide the follower 140 to be seated in either the opening slot 117 or the closing slot 118. It is noted that the opening slots 117 are depicted as opened ended at both ends while the closing slots 118 are closed at an upper end of the closing slots 118 in the +Z direction of the depicted coordinate axes. By being closed at one end, the closing slots 118 may limit the distance the follower 140 travels in the closed position.

The inner hub wall 114 may extend beyond the outer hub wall 112 in the −Z direction of the depicted coordinate axes. A plug 122 may be positioned concentrically within the inner hub wall 114, below the cam path 116. As will be described in greater detail herein, the plug 122 may be selectively positioned to block the fluid flow path 144 to the fluid orifice 162 of the top 160. The plug 122 may be connected to the inner hub wall 114 via a connecting plate 125. One or more cutouts 128 (such as a plurality of cutouts 128) may be formed within the inner hub wall 114 and/or the connecting plate 125 and radially positioned around the plug 122, depicted in FIG. 3D. As will be described, the cutouts 128 may provide fluid inlets to allow fluid to enter the closure assembly 100.

Referring again to FIGS. 3A and 3B, as noted above, the base 102 may include one or more retaining flanges 108. The one or more retaining flanges 108 may extend from the connecting wall 107 in the +Z direction of the depicted coordinate axes, within the outer peripheral wall 106. For example, the one or more retaining flanges 108 may be positioned between the outer peripheral wall 106 and the central hub 110, such as between the outer peripheral wall 106 and the outer hub wall 112 of the central hub 110. The one or more retaining flanges 108 may include any number of retaining flanges 108 such as a first retaining flange, a second retaining flange, etc. The one or more retaining flanges 108 may each comprise a hooked end 109, which may engage with a corresponding feature of the top 160 to limit a distance the top 160 may extend from the base 102 in the +Z direction of the depicted coordinate axes.

Referring again to FIG. 1E, the base 102 is mounted to the container body 12 such that the bottle neck 22 is positioned within the bottle neck-receiving orifice 124 of the base 102 and the outer peripheral wall 106 is supported on the mounting platform 16. As illustrated, the connecting wall 107 of the base 102 may be sloped at the same angle of the support portion 20 of the container body 12 such that the base 102 is approximately parallel to the support portion 20 of the container body 12. In the depicted embodiment, the central hub 110 of the base 102 may be positioned within the bottle neck 22 and extend into the container body 12. For example, and as depicted in FIG. 1E, the inner hub wall 114 and the outer hub wall 112 may be positioned within the bottle neck 22. Accordingly, at least a portion of the closure assembly is positioned within the bottle neck 22 and/or the container body 12. Such may provide for a lower height profile.

Referring now to FIGS. 4A and 4B, the follower 140 is depicted in isolation from the rest of the closure assembly 100. FIG. 4A generally depicts a front view of the follower 140 and FIG. 4B depicts a bottom view of the follower 140. The follower 140 generally includes a tubular, elongate body 142 that extends between a first end 143 and a second end 145. A fluid flow path 144 is formed through the elongate body 142 and extends from the first end 143 to the second end 145. Extending from the first end 143 in the +Z direction of the depicted coordinate axes are a plurality of top follower teeth 148. The plurality of top follower teeth 148 may be arranged radially around the fluid flow path 144. In embodiments, each of the top follower teeth 148 may generally be triangular in shape. Extending from the second end 145 of the elongate body 142 may be a plurality of base follower teeth 149 sized and shaped to be received within the cam path 116 of the base 102, described above. For example, the plurality of base follower teeth 149 extend radially from the second end 145.

The elongate body 142 may have a first diameter portion 150 at the first end 143, a second diameter portion 152 extending from the first diameter portion 150 toward the second end 145 in the −Z direction of the depicted coordinate axes, and a third diameter portion 154 extending from the second diameter portion 152 to the second end 145 in the −Z direction of the depicted coordinate axes. The first diameter portion 150 may have a larger diameter along the XY plane of the depicted coordinate axes than the second diameter portion 152, which may have a larger diameter along the XY plane of the depicted coordinate axes than the third diameter portion 154. In some embodiments, one or more sealing rings may extend radially from the elongate body 142. For example, a first sealing ring 156*a* is illustrated as extending from the second diameter portion 152. Other sealing rings are further described below. The sealing rings may be areas of increased thickness along the XY plane of the depicted coordinate axes, which may be engaged to a surface to provide a seal there between.

The follower 140 may be formed through any conventional manufacturing methods such as injection molding or the like and may be formed from one or more polymers such as polyolefin (e.g., low density polyethylene, high density polyethylene, polypropylene, polystyrene, polyvinyl chloride, polycarbonate, etc., or any combination thereof), polyester (e.g., polyethylene terephthalate, polybutylene terephthalate, etc., or any combination thereof), or any combination thereof.

Referring again to FIG. 1E, the follower 140 may be received within the central hub 110 of the base 102. For example, the second end 145 of the follower 140 may be inserted concentrically within the inner hub wall 114. As noted above, the one or more opening slots 117 of the cam path 116 may be open-ended at both ends. Such open ends may allow for ease of assembly of the follower 140 to the base 102. For example, during assembly, the follower 140 may be positioned such that the base follower teeth 149 are aligned with the opening slots 117 and are slid along the opening slots 117 to mount the follower 140 within central hub 110 and the cam path 116. In some embodiments, the first sealing ring 156*a* may circumferentially engage the inner hub wall 114, to provide a fluid seal between the inner hub wall 114 and the follower 140. As illustrated, the follower 140 may also be positioned within the bottle neck 22 and able translate through the bottle neck 22. By providing at least a portion of the closure assembly 100 be positioned within the bottle neck 22 and/or the container body 12, the height profile of the product container 10 may be reduced.

As illustrated, when positioned in the ship-locked orientation, the plug 122 may be seated within the fluid flow path 144 of the follower 140, thereby blocking fluid flow through the flow path. Furthermore, in the ship-locked orientation, the first diameter portion 152 may engage with or be positioned in close proximity to the inner hub wall 114 in the Z direction of the depicted coordinate axes. Still referring to FIG. 1E, the follower 140 may further include a second sealing ring 156*b*. The second sealing ring 156*b* may extend radially from the elongate body 142 into the fluid flow path 144. The second sealing ring 156*b* may be positioned toward the second end 145 of the follower 140 to engage with the plug 122 when in the ship-locked and/or closed configuration.

Referring now to FIGS. 5A-5D, the top 160 is depicted in isolation from the remainder of the closure assembly 100. The top 160 generally includes a user engagement portion 161 that defines the fluid orifice 162 extending therethrough. For example, the fluid orifice 162 may be centrally located on the top 160 in the XY plane of the depicted coordinate axes. The user engagement portion 161 includes an outer surface 166 and an inner surface 168 opposite the outer surface 166, wherein the fluid orifice 162 extends through the outer surface 166 and the inner surface 168. In some embodiments, the outer surface 166 of the top 160 may be substantially planar along at least a periphery of the outer surface 166 such that the outer surface 166 defines a planar portion 173. In some embodiments, the outer surface 166 may include a sloped portion 175 inset from the outer periphery of the outer surface 166 such that the planar portion 173 surrounds the sloped portion 175. The sloped portion 175 slopes to the fluid orifice 162 such that the fluid orifice 162 is recessed from the planar portion 173 of the top 160 in the −Z direction of the depicted coordinate axes. The planar portion 173 may provide a stable, planar surface on which the product container 10 may rest when not being held by a user. By recessing the fluid orifice 162 relative to the planar portion 173, product remaining at the fluid orifice 162, may be prevented from contacting or being transferred to the surface on which the product container 10 is placed, thereby providing a substantially mess-free design.

Referring specifically to FIG. 5D, surrounding the fluid orifice 162 may be a fluid orifice wall 163, which may extend from the inner surface 168 of the user engagement portion 161 in the −Z direction of the depicted coordinate axes. A plurality of top teeth 167 may extend from the inner surface 168 and may be arranged circumferentially around the fluid orifice 162 and the fluid orifice wall 163. The plurality of top teeth 167 may generally be triangular in shape to mesh with the top follower teeth 148 described above.

Still referring to FIG. 5D, extending from the inner surface 168 may be a top central hub 170. The top central hub 170 may circumscribe the plurality of top teeth 167 and the fluid orifice 162. One or more alignment ribs 171 may extend along a surface of the top central hub 170 in the +/−Z direction of the depicted coordinate axes. Also extending from the inner surface 168 may be one or more top retaining flanges 172. Each of the top retaining flanges 172 may include a hook 174 formed at an end of each top retaining flange 172. As will be described in more detail below, the top retaining flanges 172 may interact with the retaining flanges 108 of the base 102 to limit a distance the top 160 may extend from the base 102.

Referring collectively to FIGS. 5A-5D, an outer top peripheral wall 165 may extend from the second surface of the user engagement portion 161. The outer top peripheral wall 165 may be sized and shaped to be received into the top receiving volume 105 of the base 102. The top 160 may include one or more locking projections 176 configured to sit within and engage with the one or more alignment channels 136 of the base 102 and to be selectively moved into the one or more locking slots 132 extending from the alignment channels 136, described above.

In embodiments, an indicator 178 (e.g., text, images, etc.) may be molded, printed, carved, etched or otherwise provided on the outer top peripheral wall 165. The indicator 178 may allow a user to quickly and efficiently determine if the closure assembly 100 is in an open, closed or ship-locked configuration. For example, the indicator 178 may include the phrase "OPEN" to indicate when the closure assembly 100 is in an open configuration. In such embodiments, the indicator 178 may be positioned such that the phrase "OPEN" is obscured or is otherwise not visible when the closure assembly 100 is in a closed or ship-locked configuration.

Referring again to FIG. 1E, the top 160 is mounted to the base 102 such that the follower 140 is sandwiched between the base 102 and the top 160. As described herein, the top 160 may be received within the top receiving volume 105 of the base 102. That is, the outer top peripheral wall 165 may be positioned adjacent to and within the outer peripheral wall 106 of the base 102. Additionally, the top central hub 170 may be received by the base 102 between the inner hub wall 114 and the outer hub wall 112, within the bottle neck 22, as depicted. In embodiments, the one or more alignment ribs 171 may extend from the top central hub 170 and engage the outer hub wall 112. In the depicted embodiment, the fluid orifice wall 163 may be nested within the fluid flow path 144 of the follower 140 and sealed to the wall to prevent fluid from flowing between the fluid orifice wall 163 and the follower 140. For example, a third sealing ring 156*c* may extend radially inward into the fluid flow path 144 at a top end of the follower 140 to engage the fluid orifice wall 163. In some embodiments, the fluid orifice wall 163 may have a sealing ring 177 extending radially outward from the fluid orifice wall 163 to engage the elongate body 142 within the fluid flow path 144.

The top 160 may be slidable relative to the base 102 and/or the follower 140 in the +/−Z direction of the depicted coordinate axes. Motion of the base 102 in the +Z direction of the depicted coordinate axes may be limited by interaction of the locking projections 176 with the locking slots 132 of the base 102 in a ship-locked configuration, as depicted in FIG. 1E, and/or the retaining flanges 108 of the base 102 interlocking with the top retaining flanges 172 of the top 160. As illustrated, the top follower teeth 148 of the follower 140 may be engaged with the top teeth 167 of the top 160.

Still referring to FIG. 1E and as noted above, the closure assembly 100 may further include a biasing element 180 configured to bias at least one of the top 160 and/or the follower 140 away from the base 102. For example, the biasing element 180 may bias the top follower teeth 148 of the follower 140 into engagement with the top teeth 167 of the top 160 to ensure the top follower teeth 148 of the follower 140 remain in engagement with the top teeth 167 of the follower 140 during transitions between the various configurations. For example, the biasing element 180 may be a helical spring positioned between and in contact with the base 102 and the follower 140, wherein the helical spring biases the top 160 and the follower 140 away from the base 102. In such embodiments, the helical spring may circumscribe the inner hub wall 114 and engage the first diameter portion 150 of the follower 140. In some embodiments, the biasing element 180 may instead engage the top 160. It is noted that though the biasing element 180 is illustrated as a helical spring, in some embodiments, a biasing element 180 may be integral to one of the follower 140, the base 102, and/or the top 160. For example, a biasing element 180 may include flexible struts, flexures, leaf springs, or the like.

As noted above, FIG. 1A-1E depict the closure assembly 100 in the ship-locked configuration. The ship-locked configuration may be used for shipping of and/or traveling with the product container 10. For example, to prevent inadvertent opening and/or closing of the closure assembly 100, the ship-locked configuration may ensure the closure assembly 100 cannot be inadvertently moved to an open configuration during travel. As illustrated in FIG. 1E, in the ship-locked configuration the top 160 may be fully seated within the top receiving volume 105 of the base 102. In such position, the top 160 may be rotated relative to the base 102 to position the one or more locking projections 176 in the one or more locking slots 132. Accordingly, motion of the top 160 is restricted in the +Z direction of the depicted coordinate axes. In the ship-locked configuration, the plug 122 may be deeply seated within the fluid flow path 144 of the follower 140, thereby preventing fluid flow from the container body 12 to the fluid orifice 162. In the illustrated embodiment, in the ship-locked configuration, the top follower teeth 148 may be fully meshed with the top teeth 167 and the base follower teeth 149 be positioned outside of the opening slots 117 and the closing slots 118. Base openings 134 may be formed within the connecting wall 107 adjacent each of the top retaining flanges 172 to allow additional space for the top retaining flanges 172 to move into a ship-locked orientation.

Figure 6B:
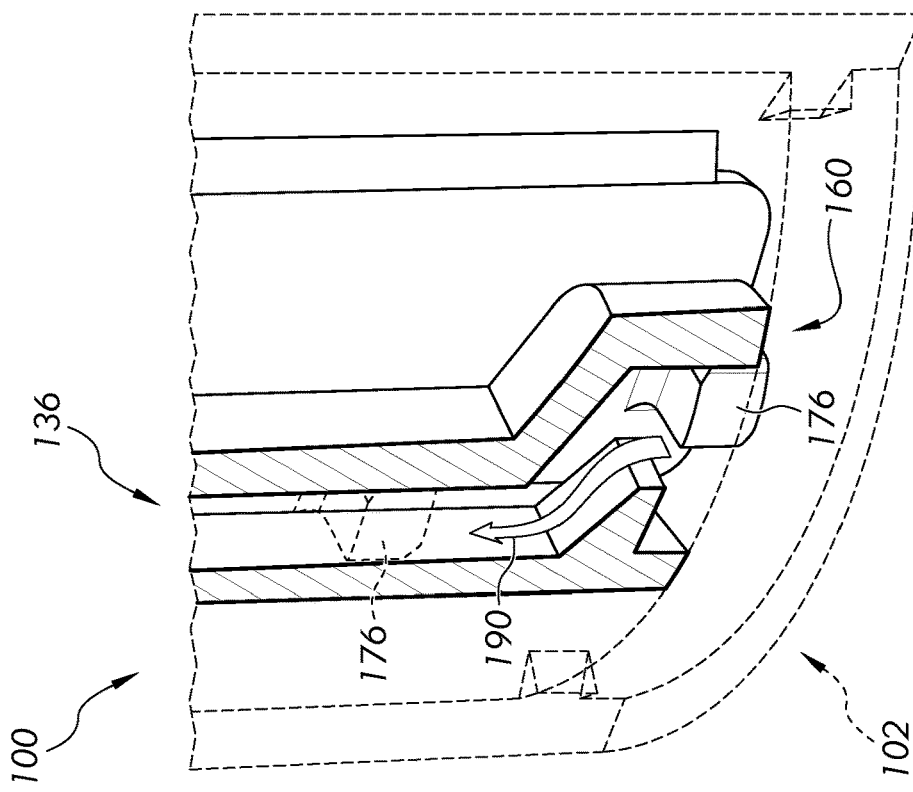
FIG. 6B depicts disengaged member of the top from the ship-locked configuration, according to one or more embodiments shown and described herein.
Figure 6A:
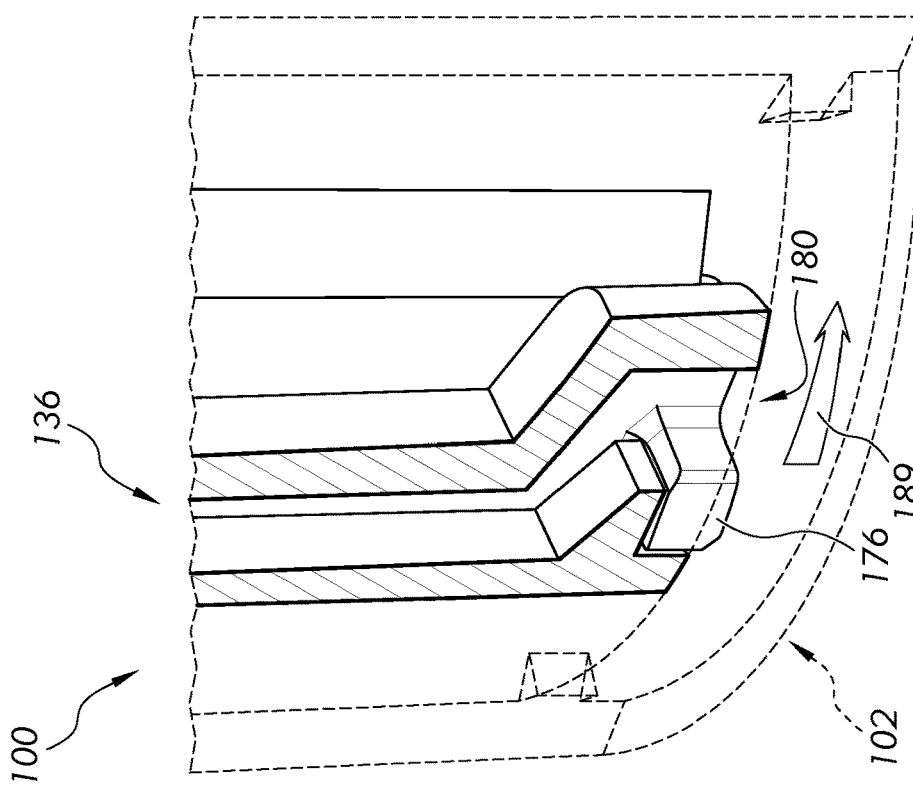
FIG. 6A depicts the top of FIG. 5A engaged with the base of FIG. 3A, in a ship-locked configuration, according to one or more embodiments shown and described herein.

FIG. 6A illustrates a locking projection 176 locked in a locking slot 132, thereby placing the closure assembly 100 in the ship-locked configuration. To move the locking projection 176 from the ship-locked configuration, the top 160 may be rotated out of the locking slot 132, e.g., in the counter-clockwise direction as indicated by arrow 189. As illustrated in FIG. 6B, once the locking projection 176 is released from the locking slot 132, the biasing force of the biasing element 180, depicted in FIG. 1E, may cause the locking projection 176 to move along arrow 190 into the alignment channel 136, which allows the closure assembly 100 to move to one of the open configuration and the closed configuration. As will become more apparent below, as the top 160 moves in the +Z direction of the depicted coordinate axes, the base follower teeth 149 may engage the leading angled surface 119a, 119b of one of the opening slots 117 and the closing slots 118, thereby causing the follower 140 to rotate and the top follower teeth 148 of the follower 140 to un-mesh from the top teeth 167 of the top 160.

Figure 7E:
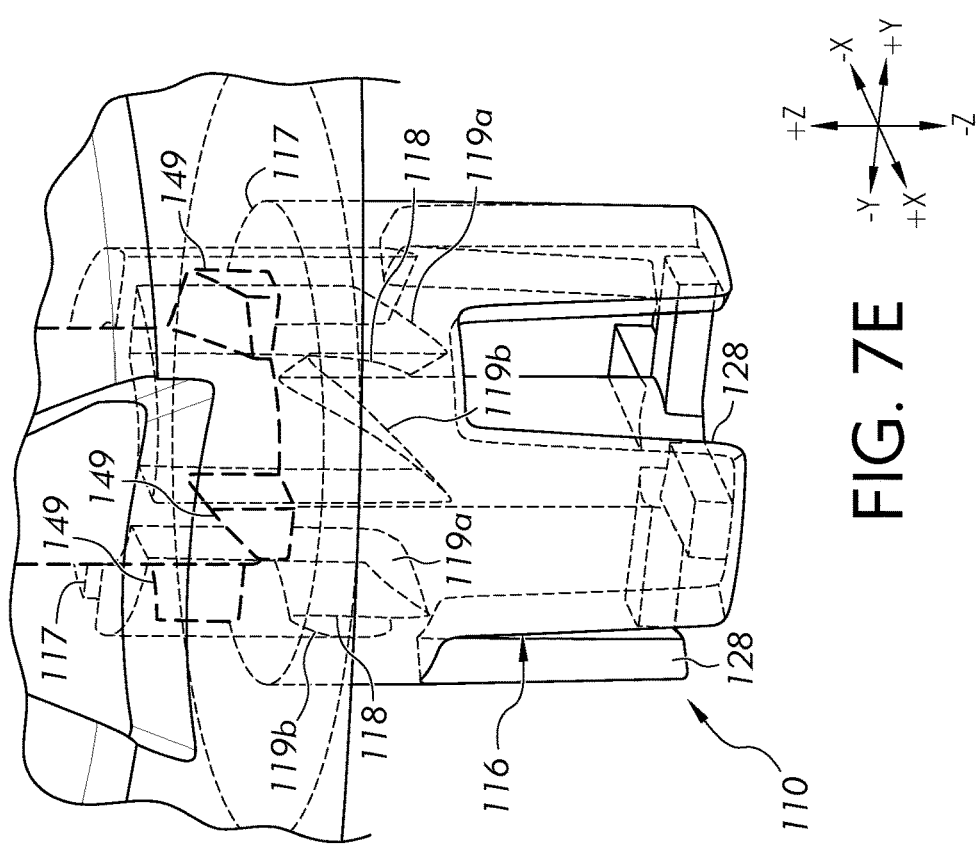
FIG. 7E depicts the follower positioned within a follower path of the base (shown as transparent) of the closure assembly of FIG. 7A, according to one or more embodiments shown and described herein.
Figure 7D:
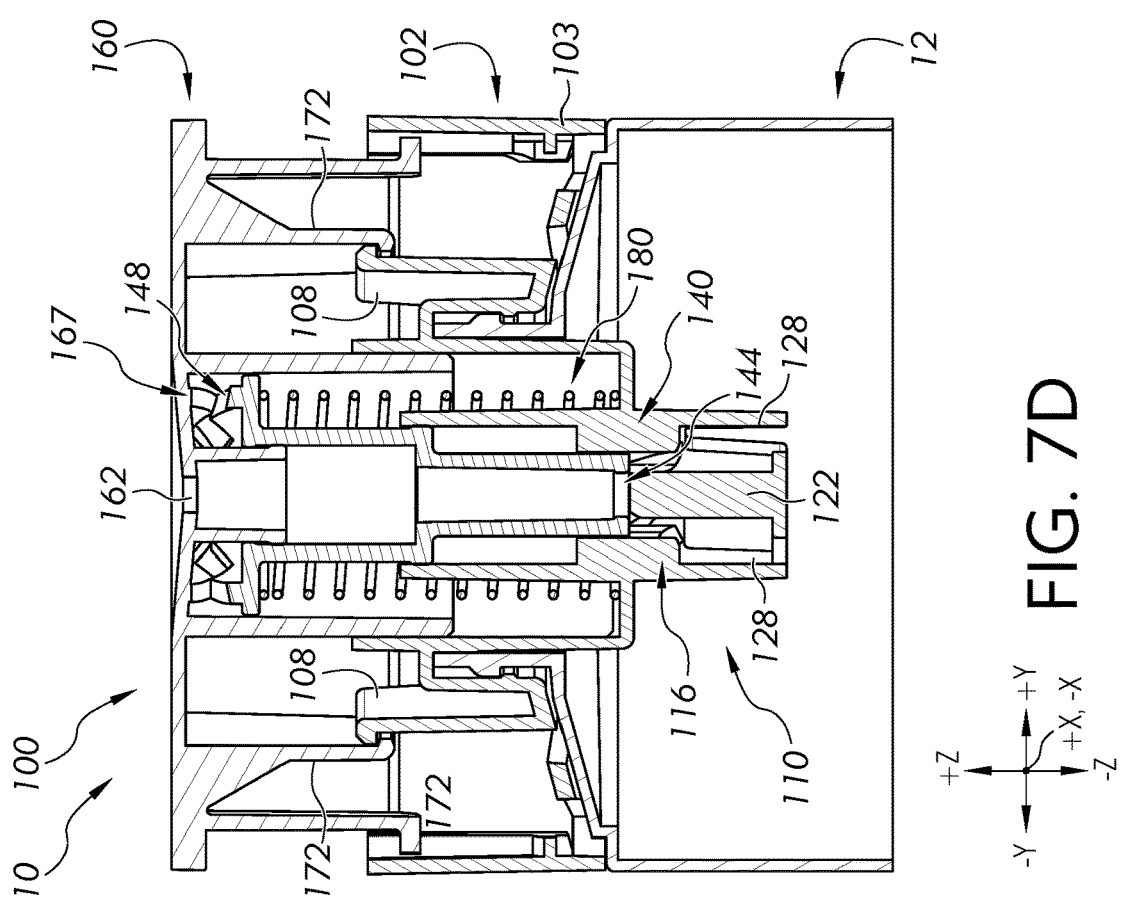
FIG. 7D depicts a cross-section of the closure assembly of FIG. 7A, according to one or more embodiments shown and described herein.

For example, FIGS. 7A-7E illustrate the product container 10 in the open configuration. FIG. 7A depicts a perspective view of the product container 10, FIG. 7B, depicts a front view of the product container 10, FIG. 7C depicts a side view of the product container 10, FIG. 7D depicts a cross-section view of the product container 10, and FIG. 7E depicts a partially transparent view of the base 102 engaged with the follower 140. As illustrated, in the open configuration, the top 160 may move in the +Z direction of the depicted coordinate axes as compared to the ship-locked or closed configurations. In the open configuration, the indicator 178 may be visible to a user, allowing the user to immediately determine whether the product container 10 is in the open configuration.

Referring specifically to FIG. 7D, when in the open configuration, biasing element 180 biases the top 160 and the follower 140 in the +Z direction of the depicted coordinate axes to move the follower 140 to an open position. In the illustrated embodiment, in the open configuration, the top 160 is positioned at it greatest vertical extent in the +Z direction of the depicted coordinate axes and is held to the base 102 via interaction with the retaining flanges 108 of the base 102 and the top retaining flanges 172 of the top 160.

In the open position the top follower teeth 148 of the follower 140 are in contact but unmeshed with the top teeth 167 of the top 160, and the plug 122 of the base 102 is spaced from the fluid flow path 144 of the follower 140. When the plug 122 is spaced from the fluid flow path 144 of the follower 140, product may flow through the fluid flow path 144 of the follower 140 and out the fluid orifice 162. For example, product may first enter the central hub 110 through the one or more cutouts 128, flow around the plug 122, flow into the fluid flow path 144, and flow out of the closure assembly 100 through the fluid orifice 162. Referring to FIG. 7E, in the open position, the base follower teeth 149 are positioned within the opening slots 117 of the base 102.

Figure 8:
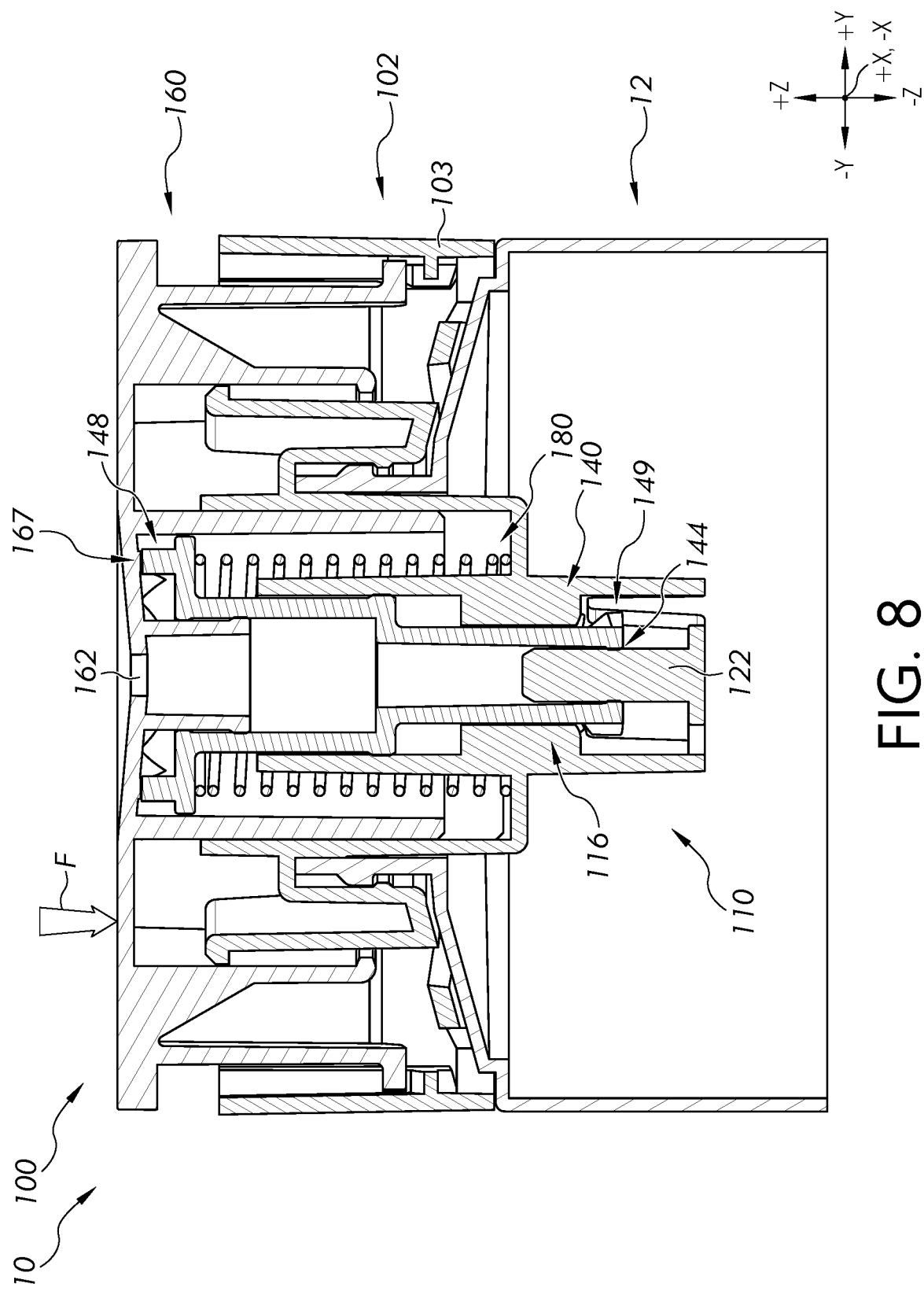
FIG. 8 depicts a cross-section of the closure assembly of FIGS. 7A-7E in a transitional state between an open configuration to a closed configuration (or from a closed configuration to an open configuration), according to one or more embodiments shown and described herein.

FIG. 8 depicts the closure assembly 100 in a transitional state between an open configuration to a closed configuration (or from a closed configuration to an open configuration). For example, to transition the closure assembly 100 to the closed configuration from the open configuration, the top 160 may be pushed or depressed into the base 102 in the −Z direction of the depicted coordinate axes, e.g., via force F provided by a user. As noted above, when in an open configuration, the top follower teeth 148 and the top teeth 167 may be unmeshed though in contact with one another (illustrated in FIG. 7D). As the top 160 is pushed downward in the −Z direction of the depicted coordinate axes, the engagement of the top teeth 167 with the top follower teeth 148 introduces a rotational moment in the follower 140 in the counter-clockwise direction, for example. Rotational motion of the follower 140 is initially restricted as the base follower teeth 149 are positioned within the opening slots 117 (illustrated in FIG. 7D). Once the base follower teeth 149 are pushed out of the opening slots 117, as illustrated in FIG. 8, engagement of the top follower teeth 148 and the top teeth 167 causes the follower 140 to rotate in the counter-clockwise direction, for example, until the top follower teeth 148 are fully meshed with the top teeth 167, such as illustrated in FIG. 8. Upon meshing of the top teeth 167 and the top follower teeth 148 a user may hear or feel an auditory or tactile response due to the top teeth 167 meshing with the top follower teeth 148. Once the downward stroke of the top 160 is completed, a user may release the top 160.

Upon release of the top 160, the bias force of the biasing element 180 pushes the top 160 and the follower 140 in the +Z direction of the depicted coordinate axes, which causes the base follower teeth 149 to enter the closing slots 118 to place the closure assembly 100 in the closed configuration and the follower 140 in a closed position, such as illustrated in FIGS. 9A-9E. As noted herein, the closing slots 118 include a leading angled surface 119b. The bias force of the biasing element 180, depicted in FIG. 9D, causes the base follower teeth 149 to travel across the leading angled surface 119b (shown in FIG. 9E), which rotates the follower 140, in the counterclockwise direction, for example, and un-meshes the top teeth 167 from the top follower teeth 148, as illustrated in FIG. 9D. As the base follower teeth 149 become fully seated within the closing slots 118, as illustrated in FIG. 9E, the user may again feel or hear a tactile and/or auditory signal (e.g., click) providing indication that the closure assembly 100 in now in the closed configuration. Once in the closed position, the plug 122 is positioned to block the fluid flow path 144. For example, the plug 122 may be seated within the fluid flow path 144 of the follower 140, thereby closing the fluid flow path 144 to the fluid orifice 162. In the closed configuration, the indicator 178 may be hidden within the base 102.

In some embodiments, it may be desirable to tune the tactile and/or auditory feedback of the base follower teeth 149 becoming seated within the closing slots 118. Accordingly, it is contemplated that the closing slots 118 may be contoured, padded, or the like, to increase or decrease resistance between the follower 140 and the closing slots 118 to tune the speed at which the follower 140 is seated within the closing slots 118, which may provide for adjustment of any resulting auditory and/or tactile feedback detected by the user. For example, greater resistance between the base follower teeth 149 and the closing slots 118 may reduce the magnitude of the resulting auditory and/or tactile feedback detected by the user. In some embodiments, the material of the follower 140, the top 160, and/or the base 102 may be chosen to achieve a certain magnitude of tactile and/or auditory feedback. For example, softer materials may decrease the magnitude of the tactile and/or auditory feedback, whereas harder materials may increase the magnitude of the tactile and/or auditory feedback. It is noted that additional modifications to a stroke length (e.g., shorter or longer) in the +/−Z direction of the depicted coordinate axes may also be made without departing from the scope of the present disclosure.

From the closed position, the closure assembly 100 may be moved to the ship-locked configuration, e.g., by pushing and/or rotating the locking projections 176 into the locking slots 132 as described above, or moved to the open position by clicking the top 160 into the base 102, similar to moving the follower 140 to the closed position, thereby causing the follower 140 to rotate from the closed position to the open position. For example, to transition the closure assembly 100 to the open configuration from the closed configuration, the top 160 may be pushed into the base 102 in the −Z direction of the depicted coordinate axes, e.g., via force F provided by a user, such as illustrated in FIG. 8. When transitioning from an closed configuration, the top follower teeth 148 and the top teeth 167 may again be unmeshed, though in contact with one another (illustrated in FIG. 9D). As the top 160 is pushed downward, the engagement of the top teeth 167 with the top follower teeth 148 introduces a rotational moment in the follower 140 in the counter clockwise direction, for example. Rotational motion of the follower 140 is initially restricted as the base follower teeth 149 are positioned within the closing slots 118 (illustrated in FIG. 9E). Once the base follower teeth 149 are pushed out of the closing slots 118, as illustrated in FIG. 8, engagement of the top follower teeth 148 and the top teeth 167 causes the follower 140 to rotate in the counterclockwise direction, for example, until the top follower teeth 148 are fully meshed with the top teeth 167, such as illustrated in FIG. 8. Upon meshing of the top teeth 167 and the top follower teeth 148 a user may hear or feel an auditory or tactile response due to the top teeth 167 meshing with the top follower teeth 148. Once the downward stroke of the top 160 is completed, a user may release the top 160.

Upon release of the top 160, the bias force of the biasing element 180 pushes the top 160 and the follower 140 in the +Z direction of the depicted coordinate axes, which causes the base follower teeth 149 to enter the opening slots 117, such as illustrated in FIG. 7E, to place the closure assembly 100 in the open configuration and the follower 140 in an open position, such as illustrated in FIG. 7D. As noted herein, the opening slots 117 include a leading angled surface 119a. The bias force of the biasing element 180, depicted in FIG. 7D causes the base follower teeth 149 to travel across the leading angled surface 119a (shown in FIG. 7E), which rotates the follower 140, in the counterclockwise direction, for example, and un-meshes the top teeth 167 from the top follower teeth 148, as illustrated in FIG. 7D.

Accordingly, a user may easily transition the above-described closure assembly 100 between an open configuration, a closed configuration, and a ship-locked configuration via interaction with the top 160. Furthermore, tactile and/or auditory feedback may provide a user indication of the closure assembly 100 being positioned within various configurations. For example, rotation of the follower 140 between the open position and the closed position may create an audible and/or tactile indication that the follower 140 has transitioned between the open position and the closed position. Such indication may provide a user increased trust that that the closure assembly 100 is open or closed. Accordingly, a user may be more likely to retain the product container 10 closure-side down, without worry that fluid will leak when the closure assembly 100 is in the closed configuration. It is noted that while the closure assembly 100 is generally depicted with an oval shaped exterior, other shapes are contemplated and possible e.g., round, rectangular, triangular, etc.

Variations of the foregoing embodiments will now be described. The following embodiments operate substantially the same as the above described components and embodiments, unless otherwise noted. Accordingly, the above description applies to the below described embodiments, unless otherwise noted or apparent, and will not be repeated.

FIGS. 10A and 10B depict a follower 140 that is substantially similar to the follower 140 described above. However, in the present embodiment, the follower 140 further includes, one or more sealing flanges, such as a first flexible seal 200, a second flexible seal 202, etc. The first flexible seal 200 and the second flexible seal 202 may increase fluid tightness of the assembly for example, the first flexible seal 200 may extend from the second diameter portion 152 to seal against the inner hub wall 114 of the central hub 110. The second flexible seal 202 may be located with the fluid flow path 144 and may be configured to interface with the plug 122.

Figure 11:
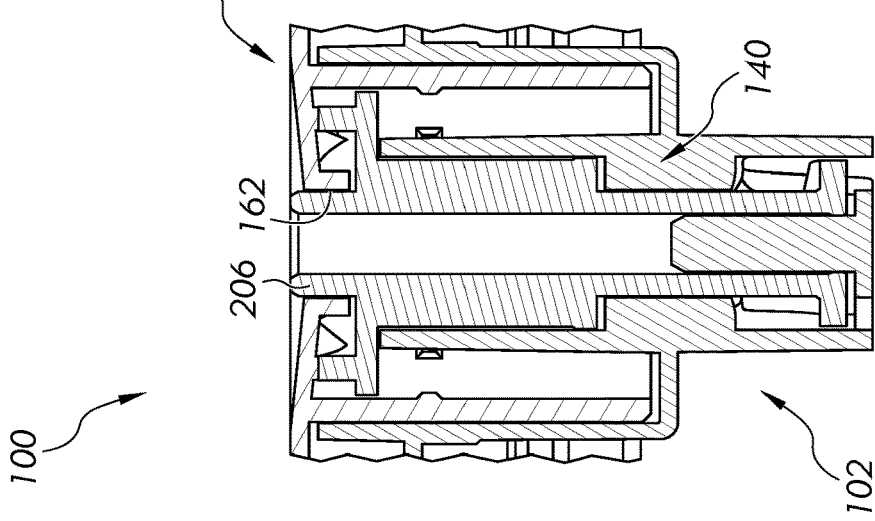
FIG. 11 depicts a cross-section of another closure assembly, according to one or more embodiments shown and described herein.

FIG. 11 depicts an alternative embodiment of a closure assembly 100 substantially similar to previous embodiments. However, in the depicted embodiment, the follower 140 includes an extending portion 206, which extends through the fluid orifice 162 of the top 160, instead of the follower 140 receiving a fluid orifice wall 163, as described above. Such embodiments may eliminate potential leakage of fluid outside of the fluid flow path 144 prior to exiting through the fluid orifice 162.

Figure 12:
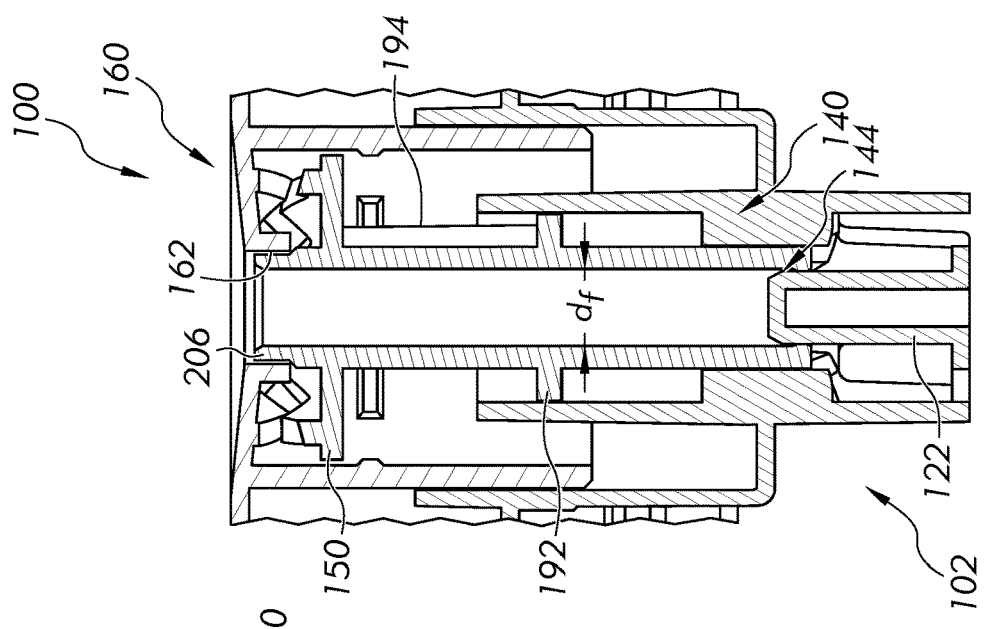
FIG. 12 depicts a cross-section of another closure assembly, according to one or more embodiments shown and described herein.

FIG. 12 depicts yet another alternative embodiment of a closure assembly 100 which differs from previous assemblies by providing a follower 140 having a substantially constant inner diameter, $d_{f}$, through the fluid flow path 144. Similar to the embodiment depicted in FIG. 11, the follower 140 also includes an extending portion 206 through the fluid orifice 162 similar to the embodiment depicted in FIG. 12. Moreover, excess material from around the follower 140 and an interior of the plug 122 has been removed, such that the plug 122 is hollow. For example, such reduction of material may lead to greater compliance of the plug 122 and follower 140 which may lead to improved sealing, and reduction in costs due to reduced material. In the illustrated embodiment, the follower 140 includes a sealing lip 192, which engages the inner hub wall 114, as opposed to the second diameter portion 152 described above. A retaining rib 194 extends from the sealing lip 192 and the first diameter portion 150, which may aid in retaining alignment of the follower 140 within the inner hub wall 114.

Figure 13:
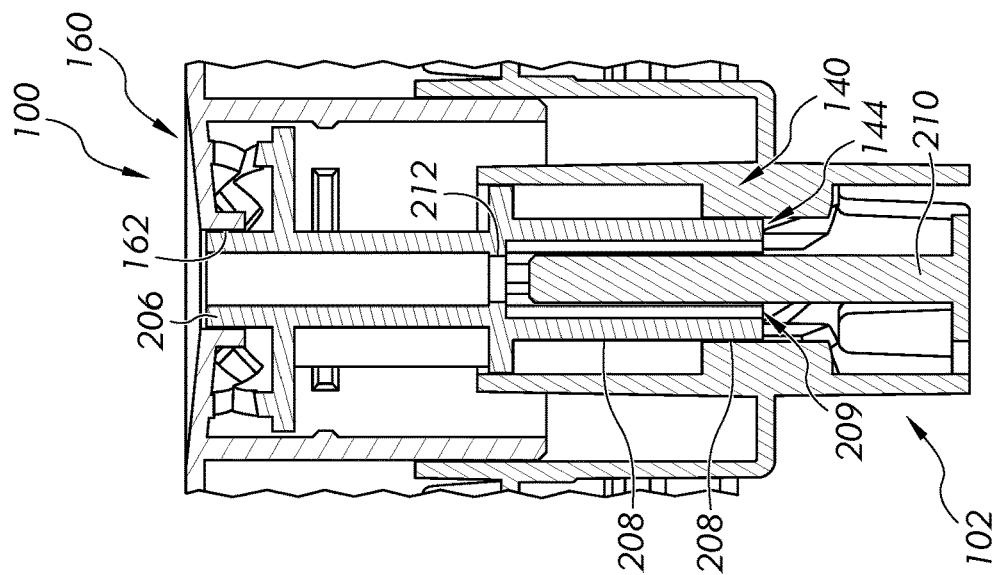
FIG. 13 depicts a cross-section of another closure assembly, according to one or more embodiments shown and described herein.

FIG. 13 depicts yet another alternative embodiment of a closure assembly 100. Similar to the embodiments depicted in FIGS. 12 and 13, the follower 140 may additionally include an extending portion 206, which extends through the fluid orifice 162. However, in the depicted embodiment, the follower 140 may include an elongated third diameter portion 208, which is elongated relative to the third diameter portion 154, described above, and comprises one or more flow channels 209 which may be positioned around an elongated plug 210. In this embodiment, the elongated plug 210 remains within the fluid flow path 144 of the follower 140 in both the open and closed positions. However, the follower 140 may include a sealing orifice 212 located at an end of the elongated third diameter portion 208. The elongated plug 210 may seal against the sealing orifice 212 in the closed position (not shown) which prevents fluid, which may otherwise be positioned within the elongated third diameter portion 208, from reaching the fluid orifice 162 in the top 160. When in the open position, as depicted in FIG. 13, the elongated plug 210 is spaced from the sealing orifice 212, though still positioned within the elongated third diameter portion 208, thereby allowing fluid to flow through the elongated diameter portion 208 around the elongated plug 210, through the sealing orifice 212, and out the fluid orifice 162 of the top 160.

FIGS. 14A and 14B depict yet another alternative embodiment of a closure assembly 300. Similar to previous embodiments, the closure assembly 300 includes a top 360, a base 302, and a follower 340. Furthermore, similar to embodiments described above, the top 360 may be moveably coupled to the base 302, and movement of the top 360 relative to the base 302 may cause the follower 340 to rotate between a closed position, in which a fluid flow path 344 is closed to a fluid orifice 362 formed in the top 360, and an open position, in which a fluid flow path 344 is open to the fluid orifice 362. However, in this embodiment, a stem 364 extends from and is integral with the top 360. For example, the stem 364 circumscribes the fluid orifice 362 and extends from the fluid orifice 362 through the base 302. In the depicted embodiment, the top teeth 366 are now located at a base 365 of the stem 364.

The base 302 includes a central hub 310 including an outer hub wall 312 and an inner hub wall 314. However, in the depicted embodiment, the cam path 316 may be formed on an external diameter of the inner hub wall 314 instead of an internal diameter, as described in the embodiments above. The plug 322 may be positioned concentrically within the inner hub wall 314 and may be substantially hollow.

The follower 340 may include top follower teeth 348 and bottom follower teeth 349. Both the top follower teeth 348 and the bottom follower teeth 349 may be formed on an inner diameter of the follower 340.

As depicted in FIG. 14A, in an assembled state, the stem 364 may extend through the central hub 310 of the base 302. The follower 340 may be positioned between the inner hub wall 314 and the outer hub wall 312 and may be engaged with the top teeth 366 of the stem 364 and the cam path 316 of the central hub 310. When in the closed position, as illustrated in FIG. 14A, the plug 322 may be positioned within the stem 364, thereby plugging a fluid flow path 344 to the fluid orifice 362. When transitioning to an open position, as with embodiments above, the top 360 may be pressed. Pressing on the top 360 moves the top 360 in the −Z direction of the depicted coordinate axes, causing the top teeth 366 to engage the top follower teeth 348 of the follower 340, which pulls the follower 340 from the cam path 316 of the central hub 310 and allows the follower 340 to rotate from the closed position to the open position. Once in the open position (not depicted), similar to embodiments described above, the plug 322 may be spaced from the stem 364, thereby allowing fluid to flow through the stem 364 and out the fluid orifice 362. This embodiment, provides the benefit of reducing the number of fluid seals needed to maintain a fluid tight closure assembly 300. For example, since the stem 364 is integral with the top 360, the stem need only seal against inner hub wall 314 when in the open configuration and against both the inner hub wall 314 and the plug 322 when in the closed configuration. In this embodiment, the biasing element (schematically depicted) may be positioned in a first position 380 between the base 302 and the top 360, as depicted, near the user engagement surface 361 of the top 360. In other embodiments, the biasing element may instead be positioned at a second position 382 between the base 302 and the follower 340 to bias the follower 340 in the +Z direction of the depicted coordinate axes.

Figure 15A:
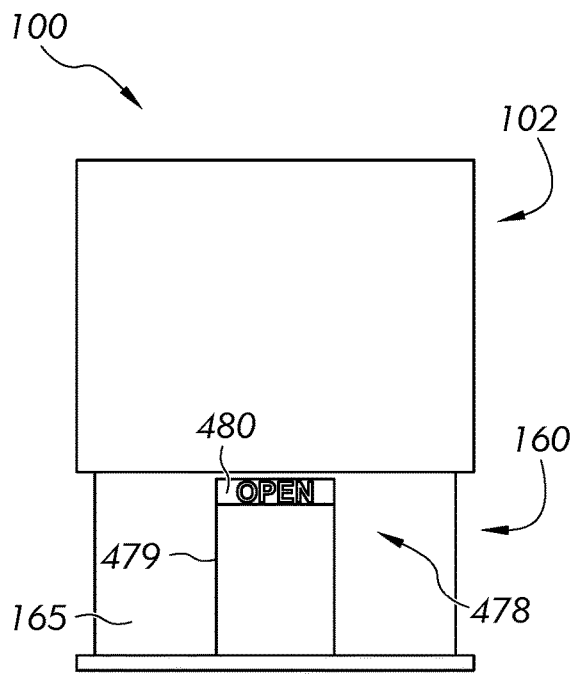
FIG. 15A depicts a front view of a closure assembly in an open position, according to one or more embodiments shown and described herein.
Figure 15B:
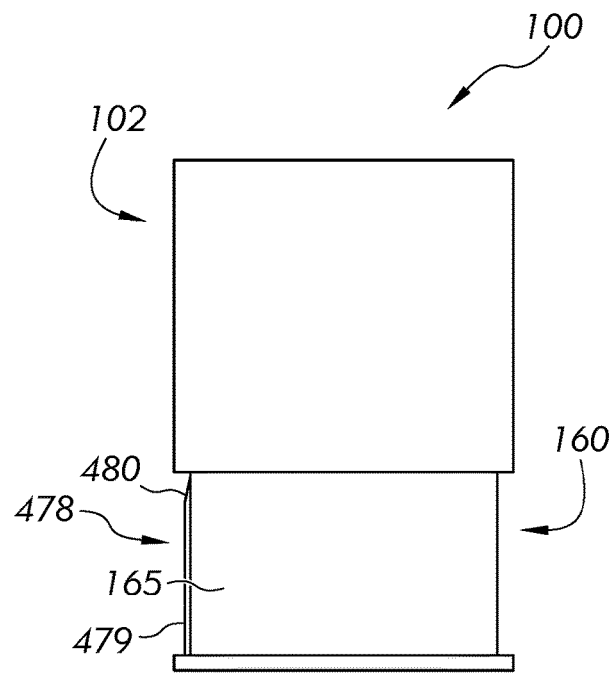
FIG. 15B depicts a side view of the closure assembly of FIG. 15A, according to one or more embodiments shown and described herein.
Figure 15C:
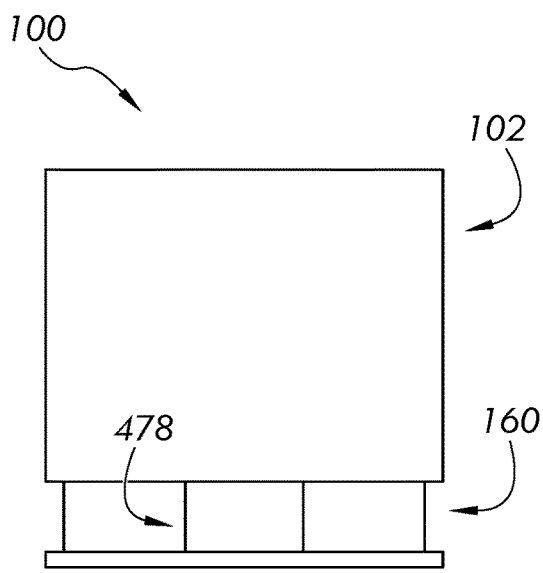
FIG. 15C depicts a front view of the closure assembly of FIG. 15A moved to a closed position, according to one or more embodiments shown and described herein.
Figure 15D:
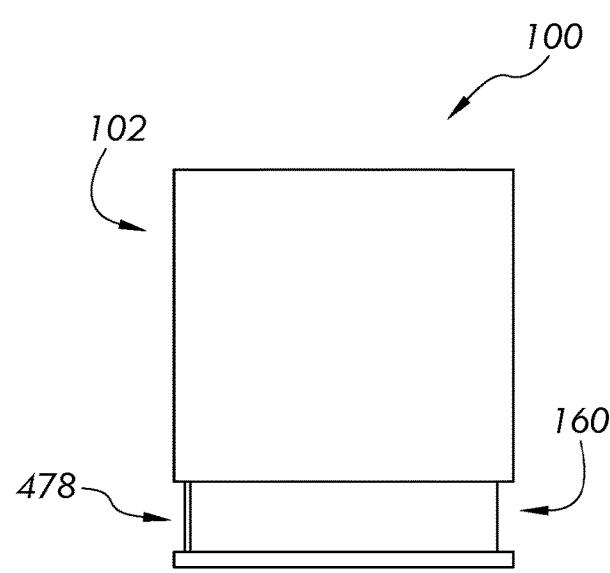
FIG. 15D depicts a side view the closure assembly of FIG. 15C, according to one or more embodiments shown and described herein.

FIGS. 15A and 15B depict an alternative embodiment of a closure assembly 100 similar to any of the above described embodiments but with an alternative indicator 478 for providing a visual indication of whether the closure assembly 100 is in the open configuration. For example, in the current embodiment, the indicator 478 may comprise a protruding surface 479 which may protrude from the outer top peripheral wall 165 to provide a more apparent visual indicator. The protruding surface 479 may include an angled surface 480 on which the word "OPEN" or some other indicator may be etched, or otherwise formed, thereby providing a strong visual indication to the user. Additionally, as depicted in FIGS. 15C and 15D, the indicator 478 may be substantially concealed when in the locked position, to indicate to a user the closure assembly 100 is locked.

Figure 16A:
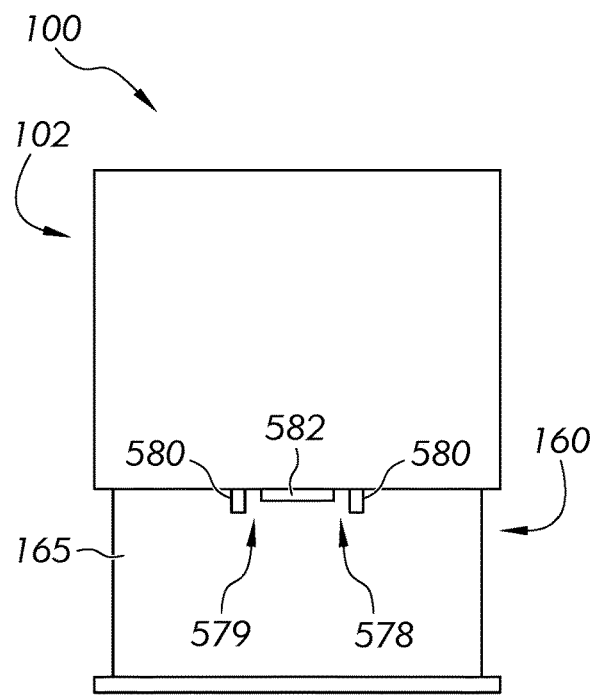
FIG. 16A depicts front view of a closure assembly in an open position, according to one or more embodiments shown and described herein.
Figure 16B:
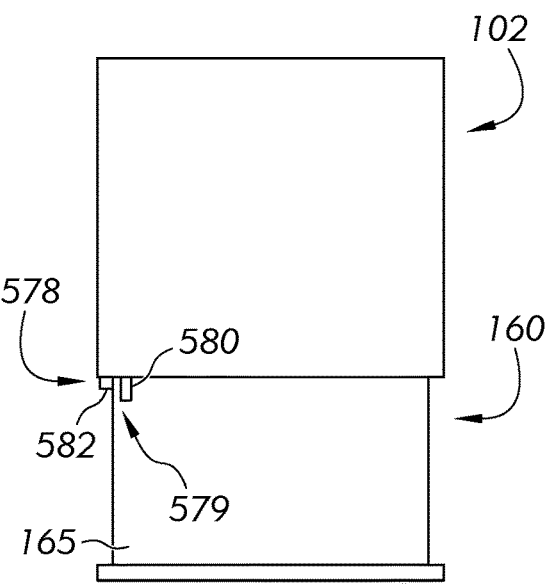
FIG. 16B depicts a side view of the closure assembly of FIG. 16A, according to one or more embodiments shown and described herein.

FIGS. 16A and 16B depict another alternative indicator 578 for a closure assembly 100. In this embodiment, the indicator 578 may be a flexible tab 579 formed in the outer top peripheral wall 165 of the top 160. The flexibility of the flexible tab 579 may be provided via cutouts 580 positioned on either side of the flexible tab 579. The flexible tab 579 may include a locking rib 582 extending therefrom. When moved to the open position, the locking rib 582 and flexible tab 579 may flex and snap out of the base 102, which may provide both a visual and audible indication that the closure assembly 100 is in an open configuration. To close the closure assembly 100, the flexible tab 579 may be pushed inward toward the base 102 to conceal the flexible tab 579 therein. It is contemplated that a recess(es) may be formed within the base 102, which may receive the locking rib 582 when in the locked and/or ship-locked configurations.

Figure 17:
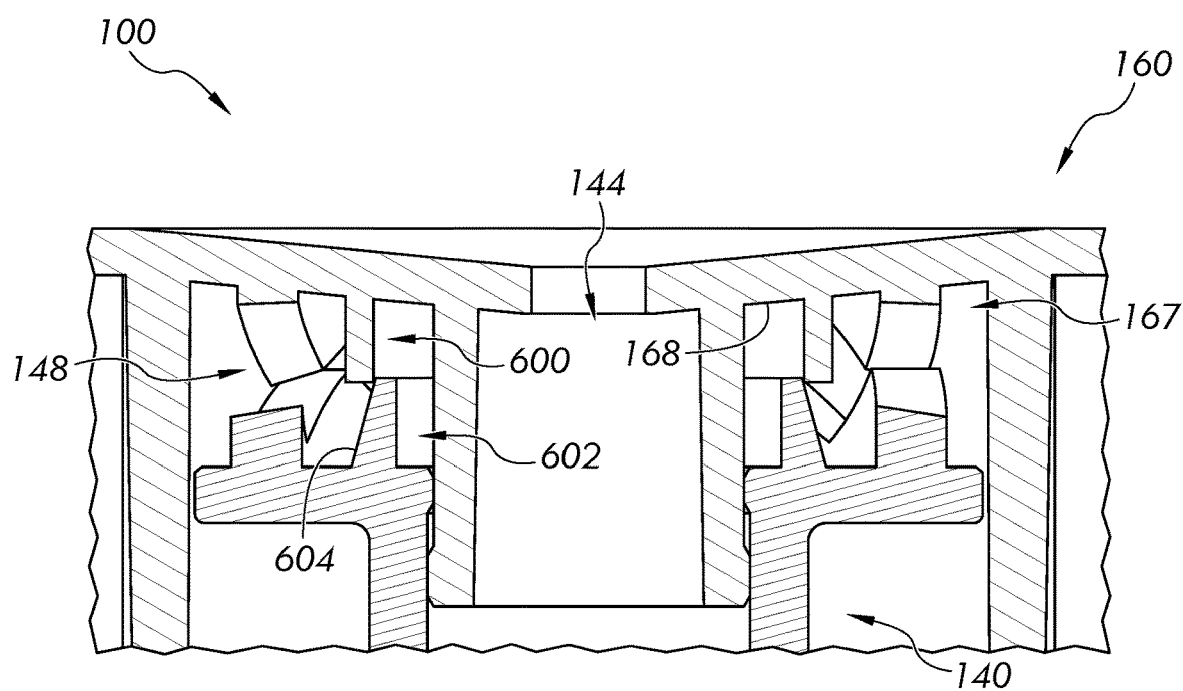
FIG. 17 depicts a top and follower of a closure assembly, according to one or more embodiments shown and described herein.

FIG. 17 depicts yet another alternative embodiment of a closure assembly 100. However, in this embodiment, a first tuning flange 600 extends from the inner surface 168 of the top 160 and a second tuning flange 602 extends from the follower 140. As noted above, in embodiments, it may be desirable to adjust the magnitude of any tactile and/or auditory feedback. One way of adjusting the magnitude of the tactile and/or auditory feedback, is to increase resistance to the top follower teeth 148 becoming fully seated, i.e., meshed, with the top teeth 167 of the top 160. For example, the first and second tuning flanges 600, 602 may be positioned to engage one another to slow a speed and/or reduce an impact force of the top follower teeth 148 meshing with the top teeth 167. In embodiments, the first tuning flange 600 may be positioned radially within the plurality of top teeth 167. The second tuning flange 602 may be positioned radially within the plurality of top follower teeth 148. The second tuning flange 602 may have a sloped lead surface 604 engaged with the first tuning flange 600. As the top 160 is pushed down onto the follower 140, the first tuning flange 600 and/or the second tuning flange 602 may deflect, which may reduce the impact force or the speed of impact of the follower 140 meshing with the top 160, and result in a reduction of magnitude of any tactile and/or auditory feedback and provide an improved user experience. It is noted that while the first and second tuning flanges 600, 602 may be continuous to encircle the fluid flow path 144, in some embodiments, the first and second tuning flanges 600, 602 may be discontinuous around the fluid flow path 144 such that the first and second tuning flanges 600, 602 do not fully encircle to fluid flow path 144.

Figure 18:
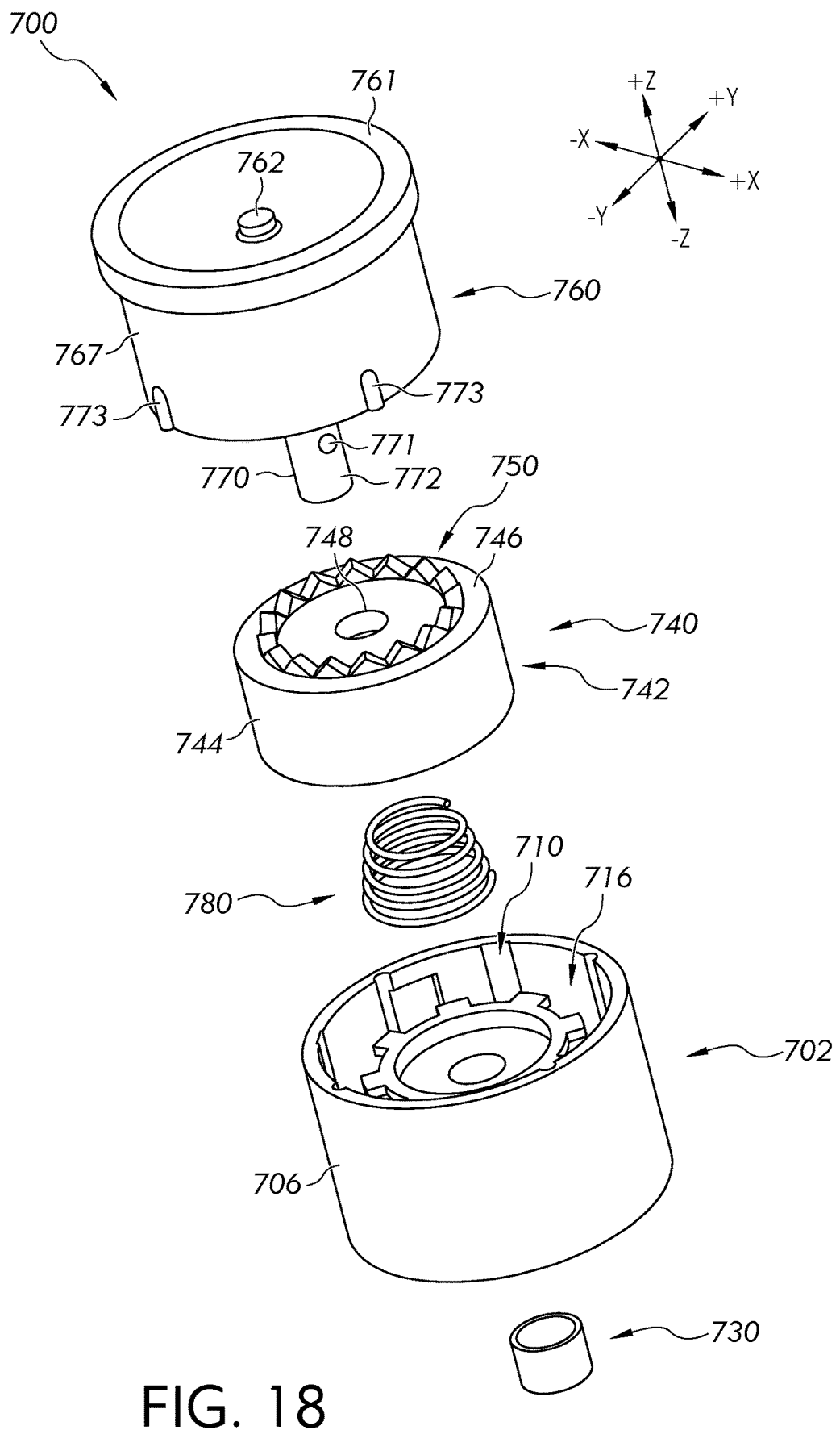
FIG. 18 depicts an exploded view of yet another closure assembly, according to one or more embodiments shown and described herein.

FIG. 18 depicts an exploded view of yet another closure assembly 700 according to one or more embodiments shown and described herein. In the depicted embodiment, the closure assembly 700 may include a top 760, a follower 740, a biasing element 780, a base 702, and a plug cap 730. The embodiment may operate in a substantially similar manner and include many similar features to the embodiments described above, accordingly the above description may be applicable to the present embodiment unless otherwise noted or apparent.

In the depicted embodiment, the base 702 includes an outer peripheral wall 706 and a central hub 710. The central hub 710 defines a cam path 716 which may include a plurality of opening slots 717 (shown in FIGS. 19A-19D) and a plurality of closing slots 718. In the depicted embodiment, the cam path 716 is formed on an outer perimeter of the central hub 710. Though not shown, the base 702 may also include alignment channels and/or locking protrusions for locking the closure assembly 700 in a ship-locked configuration, as described in embodiments above.

The follower 740 may generally define a follower body 742. The follower body 742 may generally comprise a sidewall 744 and a top wall 746. A stem receiving orifice 748 extends through the top wall 746. As in the above embodiments, the follower 740 includes a plurality of top follower teeth 750. In the present embodiment, the plurality of top follower teeth 750 extend from the top wall 746 and circumscribe the stem receiving orifice 748. The base follower teeth 749 may extend inward from the sidewall 744 and are depicted in FIGS. 19A-19D.

Still referring to FIG. 18, the top 760 may generally include a user engagement portion 761 and an outer top peripheral wall 767, similar to the above-described embodiments. The fluid orifice 762 may extend through the user engagement portion 761. However, in the present embodiment, the top 760 may comprise a stem 770 fluidly coupled to the fluid orifice 762. The stem 770 may extend below the outer top peripheral wall 767 in the −Z direction of the depicted coordinate axes. The stem 770 may include a fluid inlet opening 771 for intake of product into the stem 770. For example, the fluid inlet opening 771 may be positioned along a sidewall of the stem 770, instead of an end of the stem 770. The top 760 may further include one or more locking projections 773, such as described above, which may engage with one or more locking slots (not shown) in the base 702 for locking the closure assembly 100 in a ship-locked configuration. The top 760 further includes a plurality of top teeth 772, depicted in FIGS. 19A-19D, similar to those described above, may be positioned circumferentially about the fluid orifice 762.

The closure assembly 700 may further include a plug cap 730. The plug cap 730 may be a cap which may be mounted over an end of the stem 770. In embodiments, the plug cap 730 may be adhered to the stem 770 with adhesive, threading, or the like to couple the plug cap 730 to the stem 770.

The biasing element 780 may be substantially similar to the biasing element 180 described above and may be operable to bias the top 760 and the follower 740 away from the base 702. It is noted that similar to the above described embodiment, the biasing element 780 may instead by integral within one of the follower 740 and/or the base 702.

Figure 19D:
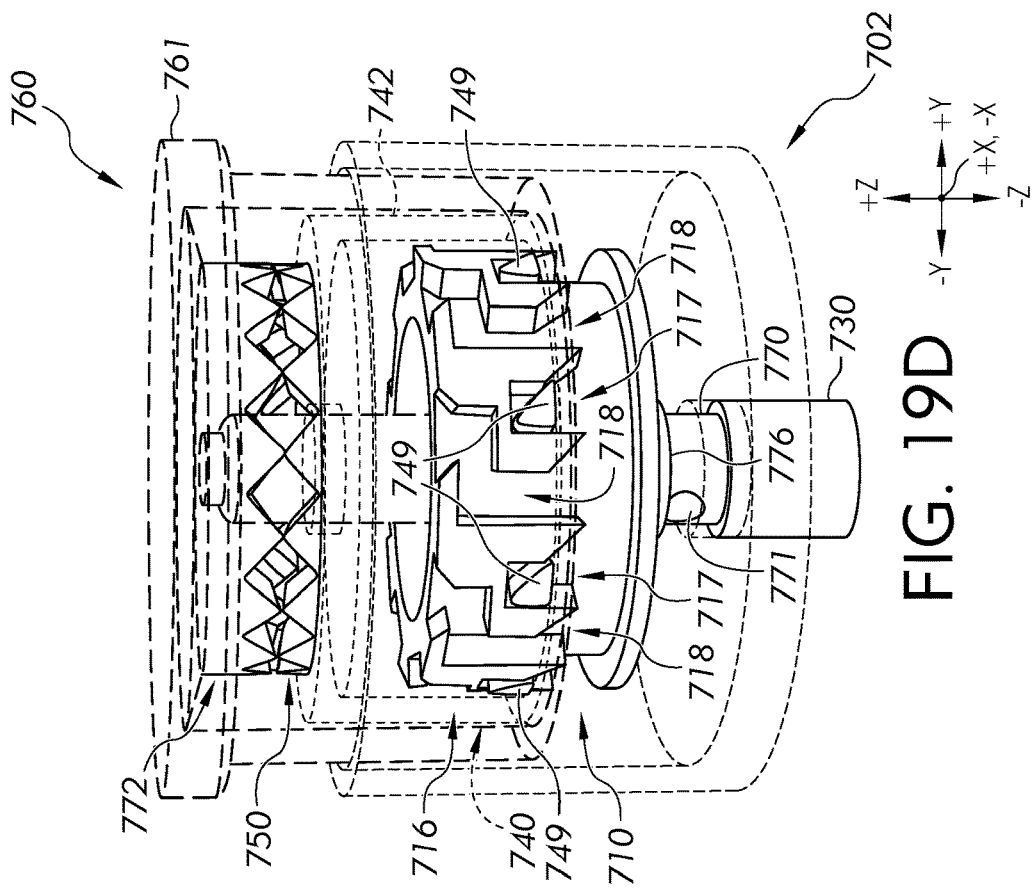
FIG. 19D depicts the top and follower of the closure assembly of FIG. 19C positioned in the open position, according to one or more embodiments shown and described herein.

Referring now to FIGS. 19A-19B, transition of the closure assembly 700 from a closed configuration (FIG. 19A) to an open configuration (FIG. 19D). It is noted that the closure assembly 700 is depicted without the biasing element 780 for simplification.

FIG. 19A depicts the closure assembly 700 in the closed configuration. As depicted, the top 760 is substantially withdrawn from the base 702 such that the stem 770 is retracted and the fluid inlet opening 771 is positioned within central hub 710 of the base 702. In this position, the plug cap 730 may be engaged with the central hub 710, which may prevent fluid from entering the follower body 742 and reaching the fluid inlet opening 771. In some embodiments, the central hub 710 may comprise a sealing sleeve 776 through which the stem 770 moves to selectively seal the fluid inlet opening 771 when positioned within the sealing sleeve 776. Additionally, as depicted the plurality of base follower teeth 749 of the follower 740 may each be positioned within the plurality of closing slots 718 of the cam path 716. It is noted that in this embodiment the longer slots are the closing slots 718, while the shorter slots are the opening slots 717. Additionally, in this embodiment, the plurality of closing slots 718 are open ended at both ends to allow assembly of the follower 740 to the base 702.

Figure 19C:
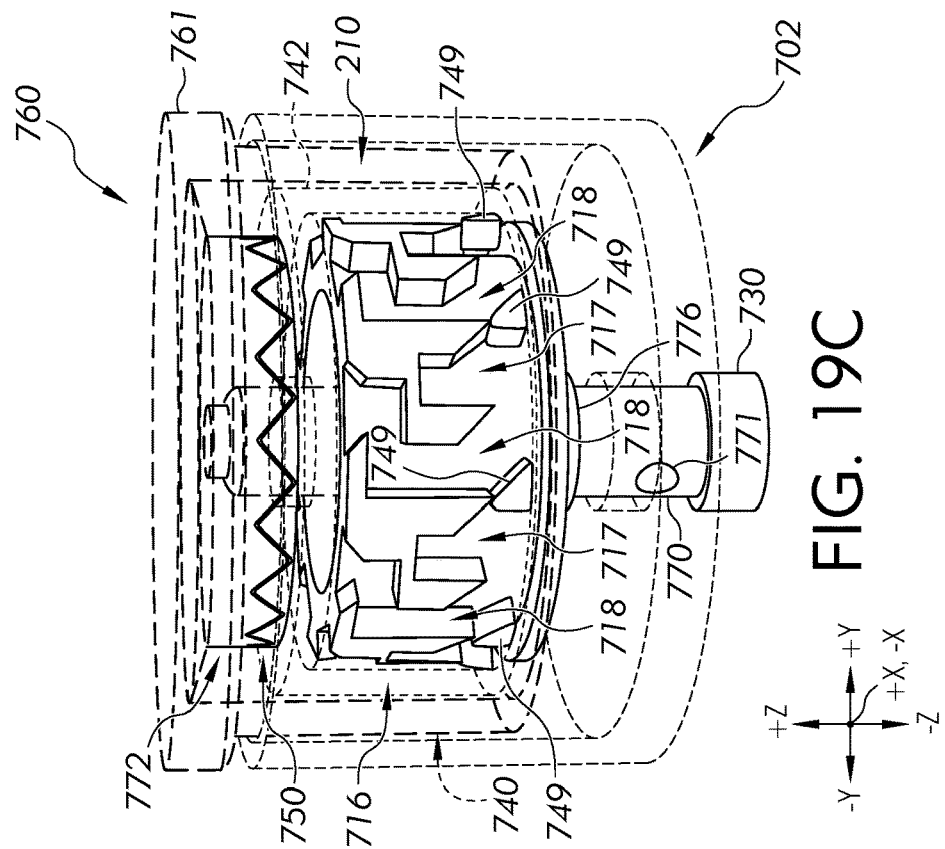
FIG. 19C depicts the top and follower of the closure assembly of FIG. 19B, moving an open position, according to one or more embodiments shown and described herein.

To transition the closure assembly 700 to the open configuration a force F may be applied to the top 760. Similar to embodiments above, as the top 760 is pushed downward, the engagement of the top teeth 772 with the top follower teeth 750 introduces a rotational moment in the follower 740 in the clockwise direction, for example. Rotational motion of the follower 740 is initially restricted as the base follower teeth 749 are positioned within the closing slots 118 and the follower 740 moves downward in the −Z direction of the depicted coordinate axes, as depicted in FIG. 19B. Once the base follower teeth 749 are pushed out of the closing slots 718, as illustrated in 19C, engagement of the top follower teeth 750 and the top teeth 772 causes the follower 740 to rotate in the clockwise direction, for example, until the top follower teeth 750 are fully meshed with the top teeth 772, such as illustrated in FIG. 19C. Upon meshing of the top teeth 772 and the top follower teeth 750, a user may hear or feel an auditory or tactile response due to the top teeth 772 meshing with the top follower teeth 750. Once the downward stroke of the top 760 is completed, a user may release the top 760.

Upon release of the top 760, the bias force of the biasing element 780 (depicted in FIG. 18) pushes the top 760 and the follower 740 in the +Z direction of the depicted coordinate axes, which allows the base follower teeth 749 to enter the opening slots 717, such as illustrated in FIG. 19D to place the closure assembly 100 in the open configuration and the follower 140 in an open position such that the fluid inlet opening 771 is exposed to allow fluid to enter. Pressing on the top 760 again may return the closure assembly 700 to the closed configuration depicted in FIG. 19A. It is noted that from the closed position, the top 760 may be rotated (e.g., clockwise or counterclockwise) to engage the locking projections 773 with locking slots, not shown, to place the closure assembly 100 in a ship-locked configuration.

Figure 20:
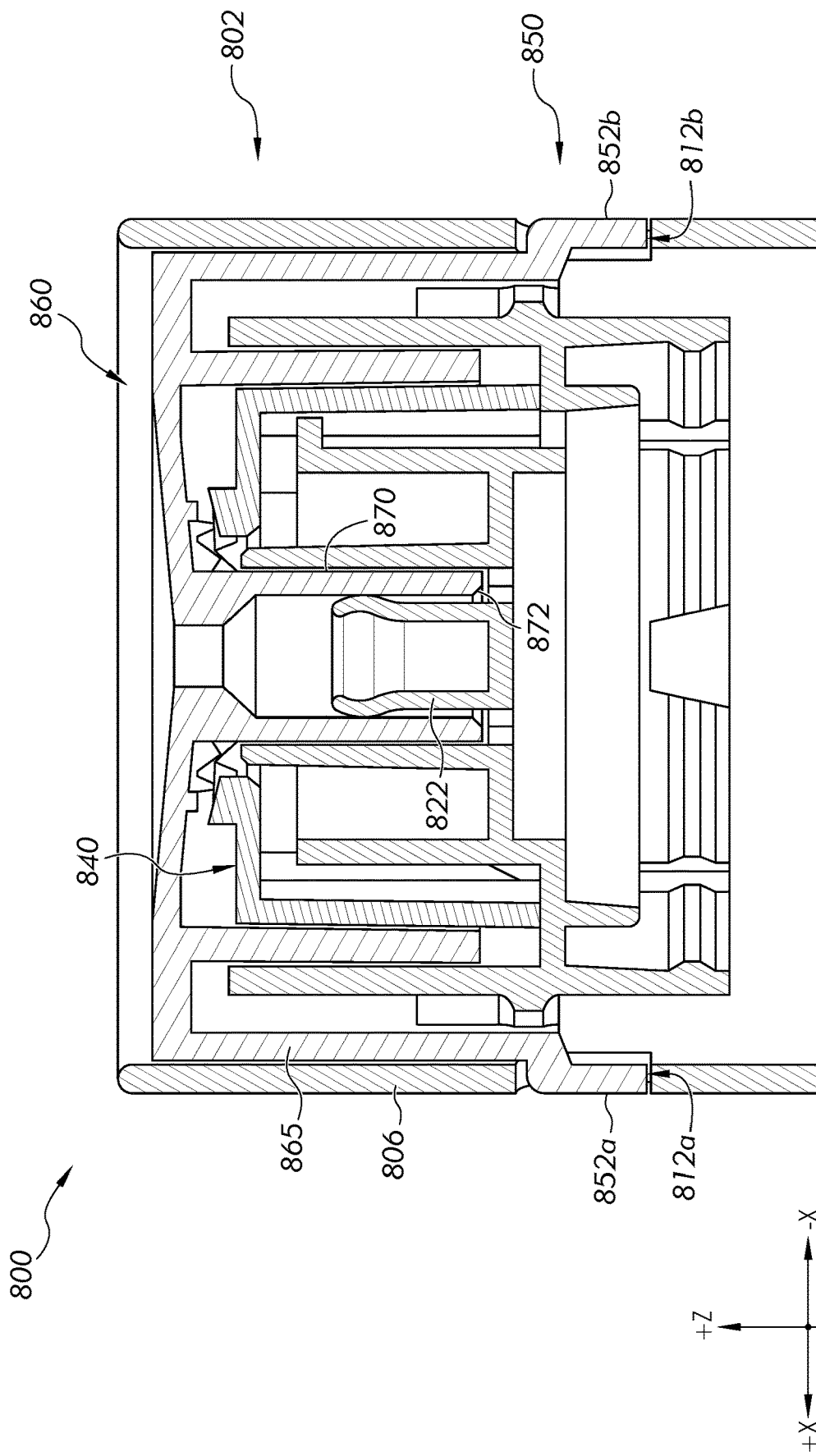
FIG. 20 depicts yet another closure assembly having an alternative ship-locking mechanism, according to one or more embodiments shown and described herein.

Referring now to FIG. 20, yet another embodiment of a closure assembly 800 is schematically depicted. This embodiment is similar to the embodiment described with respect to FIGS. 18-19D. For example, the closure assembly 800 may include a top 860 including a stem 870, a follower 840, a biasing element (not depicted), and a base 802. However, in the present embodiment, instead of a plug cap, a plug 822 is integral with the base 802 similar to embodiments described above and illustrated in FIGS. 1E, 3B-3F. 7D-8, 11-13, and/or 14A. As the top 860 and follower 840 translate in the +/−Z direction of the depicted coordinate axes, the plug 822 may be spaced from a fluid inlet 872 formed in the stem 870.

Additionally, FIG. 20 is depicted in a ship-locked configuration and includes an alternative ship-locking mechanism 850 for placing the closure assembly 800 in a ship-locked configuration and which may be applied to any of the above-described embodiments. In particular, the ship-locking mechanism 850 include one or more push tabs 852a, 852b such as a first push tab 852a and a second push tab 852b, which may extend laterally (e.g., in the X and/or Y directions of the depicted coordinate axes) from an outer top peripheral wall 865 of the top 860. The one or more push tabs 852a, 852b may extend through one or more windows 812a, 812b such as a first window 812a and a second window 812b formed within an outer peripheral wall 806 of the base 802. A user wanting to move the closure assembly 800 from the ship-locked configuration may press the one or more push tabs 852a, 852b inward through the one or more windows 812a, 812b to release the top 860 from the base 802 and allow the top 860 and/or the follower 840 to stroke upward (e.g., under a biasing force provided via the biasing element) to allow for translation between an open and closed configuration.

Figure 21A:
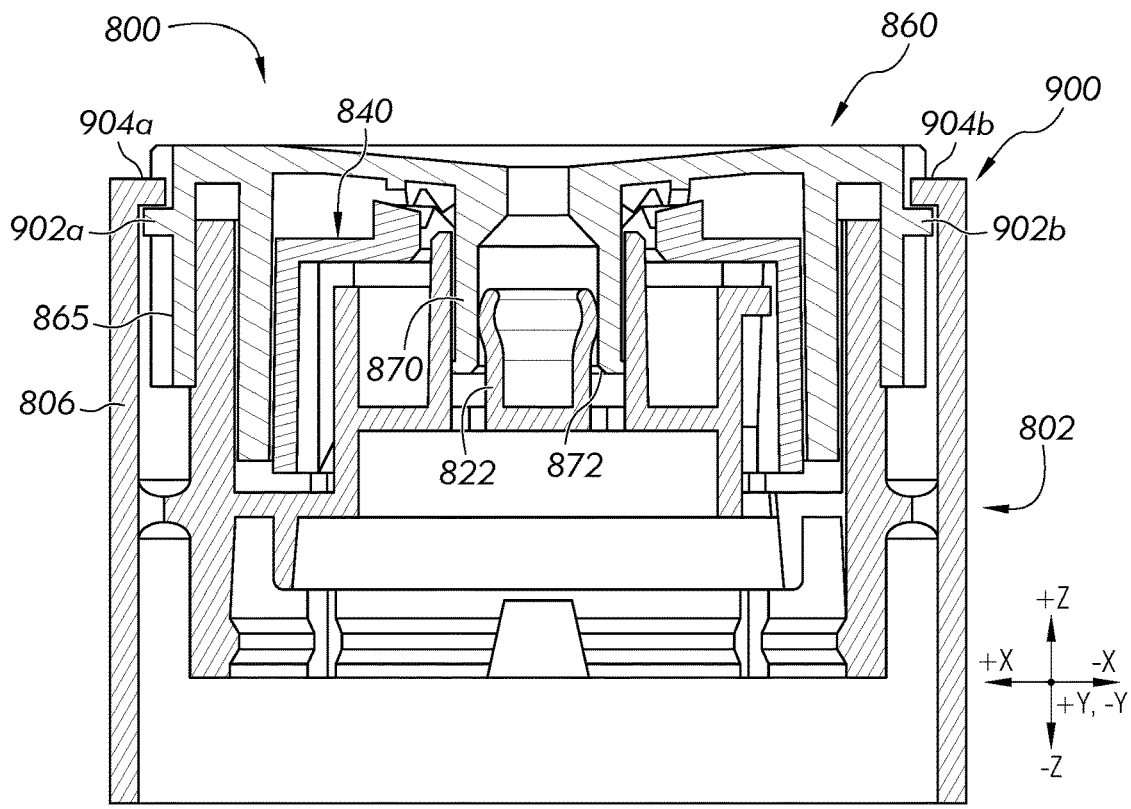
FIG. 21A depicts yet another closure assembly having an alternative ship-locking mechanism, according to one or more embodiment shown and described herein.
Figure 21B:
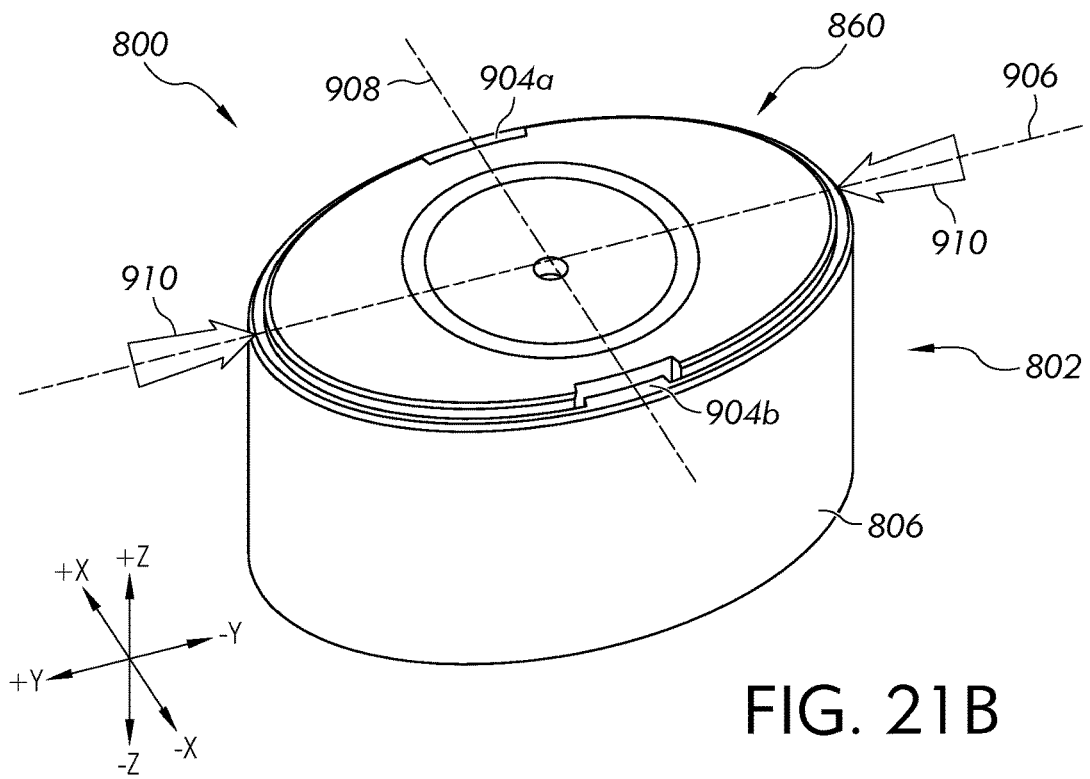
FIG. 21B depicts actuation of the closure assembly of FIG. 21A to release the closure assembly from the ship-locked configuration, according to one or more embodiments shown and described herein.

FIGS. 21A and 21B depict the closure assembly 800 of FIG. 20 with an alternative ship-locking mechanism 900, which may be incorporated into any of the embodiments described herein. In the depicted embodiment, the ship-locking mechanism 900 includes one or more top locking tabs 902a, 902b formed in the top 860 and one or more base locking tabs 904a, 904b formed in the base 802. The one or more top locking tabs 902a, 902b may project laterally from the outer top peripheral wall 865 of the top 860. For example, a first top locking tab 902a may extend from a first side of the outer top peripheral wall 865 and a second locking tab 902b may extend from an opposite side of the outer top peripheral wall 865. The one or more base locking tabs 904a, 904b may include a first base locking tab 904a extending inward from the outer peripheral wall 806 of the base 802 on a first side of the base 802, and a second base locking tab 904b extending inward from the outer peripheral wall 806 at a position opposite the first base locking tab 904a. When in the ship-locked configuration as depicted, the one or more base locking tabs 904a, 904b may be positioned over (e.g., in the +Z direction of the depicted coordinate axes) and in contact with the one or more top locking tabs 902a, 902b thereby preventing translation of the top 860 relative to the base 802 in the +Z direction of the depicted coordinate axes.

The one or more top locking tabs 902a, 902b and the one or more base locking tabs 904a, 904b may be positioned along either the major axis 906 and/or the minor axis 908 (as depicted) of the lid assembly. To release the closure assembly 100 from the ship-locked configuration, a user may squeeze (indicated by double arrows 910) the other of the major axis 906 (as depicted) or minor axis of the base 802. Squeezing the base 802, may cause the one or more base locking tabs 904a, 904b to flex outward (e.g., in the +/−Y direction of the depicted coordinate axes), so as to no longer be positioned over and/or in contact with the one or more top locking tabs 902a, 902b, which may allow the top 860 and/or the follower 840, being biased via a biasing element (not shown), to translate in the +Z direction of the depicted coordinate axes so as to be moveable between a locked configuration and/or the unlocked configuration.

Embodiments may be further described with respect to the below clauses:

1. A closure assembly including a top comprising: a user engagement portion defining a fluid orifice therethrough, the user engagement portion comprising: an outer surface; an inner surface opposite the outer surface, wherein the fluid orifice extends through the outer surface and the inner surface; and a plurality of top teeth extending from the inner surface and arranged around the fluid orifice; a base coupled to the top, wherein the top is moveable relative to the base, the base comprising a central hub defining a cam path comprising a plurality of opening slots and a plurality of closing slots; and a follower positioned between the top and the base, the follower comprising a plurality of top follower teeth engaged with the plurality of top teeth of the top and a plurality of base follower teeth disposed in the cam path of the base, wherein: the top and the follower are biased away from the base; and depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

2. The closure assembly of clause 1, wherein rotation of the follower between the open positioned and the closed position creates an audible or tactile indication that the follower has transitioned between the open position and the closed position.

3. The closure assembly of any preceding clause, wherein the outer surface comprises a sloped portion that slopes to the fluid orifice.

4. The closure assembly of any preceding clause, further comprising a helical spring positioned between and in contact with the base and the follower, wherein the helical spring biases the top and the follower away from the base.

5. The closure assembly of any preceding clause, wherein: the base comprises one or more locking slots, the top comprises one or more locking projections, and the top is rotated relative to the base to position the one or more locking projections in the one or more locking slots, thereby locking the top in a ship-locked configuration.

6. The closure assembly of any preceding clause, further comprising a plug, wherein: when the follower is in the closed position, the plug is positioned within the follower to block the fluid flow path to the fluid orifice; and when the follower is in the open position, the plug is spaced from the follower.

7. A closure assembly comprising: a top comprising: a user engagement portion defining a fluid orifice therethrough, the user engagement portion comprising: an outer surface; an inner surface opposite the outer surface, wherein the fluid orifice extends through the outer surface and the inner surface; and a plurality of top teeth extending from the inner surface and arranged around the fluid orifice; a base coupled to the top, wherein the top is moveable relative to the base, the base comprising a central hub defining an cam path formed on an inner diameter of the central hub, the cam path comprising a plurality of opening slots and a plurality of closing slots; and a follower positioned within the central hub of the base and extending between the top and the base, the follower comprising a plurality of top follower teeth engaged with the plurality of top teeth of the top and a plurality of base follower teeth disposed in the cam path of the base, wherein: the top and the follower are biased away from the base; and depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

8. The closure assembly of any preceding clause, wherein rotation of the follower between the open positioned and the closed position creates an audible or tactile indication that the follower has transitioned between the open position and the closed position.

9. The closure assembly of any preceding clause, wherein the outer surface comprises a sloped portion that slopes to the fluid orifice.

10. The closure assembly of any preceding clause, wherein the top comprises a fluid orifice wall extending from the inner surface of the top around the fluid orifice.

11. The closure assembly of any preceding clause, the follower comprises an elongate body defining the fluid flow path and the fluid orifice wall is positioned within the elongate body of the follower.

12. The closure assembly of any preceding clause, wherein: the base comprises a plug coupled to and positioned concentrically within the central hub; the plug is positioned within and seals the fluid flow path of the follower when the follower rotates to the closed position; and the plug is spaced from the fluid flow path of the follower when the follower rotates to the open position.

13. The closure assembly of any preceding clause, wherein the follower comprises a first flexible seal extending radially outward from the elongate body of the follower, and a second flexible seal extending radially into the fluid flow path from the elongate body of the follower.

14. The closure assembly of any preceding clause, wherein: the base comprises one or more locking slots, the top comprises one or more locking projections, and the top is rotated relative to the base to position the one or more locking projections in the one or more locking slots, thereby locking the top in a ship-locked configuration.

15. A product container comprising: a container body; a closure assembly coupled to the container body, the closure assembly comprising: a base coupled to the container body and comprising a cam path comprising a plurality of opening slots and a plurality of closing slots; a top moveably coupled to the base and comprising a fluid orifice and a plurality of top teeth arranged circumferentially around the fluid orifice; and a follower comprising a plurality of top follower teeth engaged with the plurality of top teeth of the top and a plurality of base follower teeth disposed in the cam path of the base, wherein depression of the top relative to the base causes the follower to rotate relative to the top between an open position in which the plurality of base follower teeth are positioned within the plurality of opening slots and a fluid flow path extending from the container body to the fluid orifice is opened and a closed position in which the plurality of base follower teeth are positioned within the plurality of closing slots and the fluid flow path is closed.

16. The closure assembly of any preceding clause, wherein rotation of the follower between the open positioned and the closed position creates an audible or tactile indication that the follower has transitioned between the open position and the closed position.

17. The closure assembly of any preceding clause, wherein the fluid flow path extends through the follower to the fluid orifice.

18. The closure assembly of any preceding clause, wherein: the base comprises a plug positioned concentrically with the cam path; the plug is positioned within and seals the fluid flow path of the follower when the follower rotates to the closed position; and the plug is spaced from the fluid flow path of the follower when the follower rotates to the open position.

19. The closure assembly of any preceding clause, wherein the follower comprises a first flexible seal extend extending radially outward from an elongate body of the follower, and a second flexible seal extending radially into the fluid flow path from the elongate body of the follower.

20. The closure assembly of any preceding clause, wherein: the base comprises one or more locking slots, the top comprises one or more locking projections, and the top is rotated relative to the base to position the one or more locking projections in the one or more locking slots, thereby locking the top in a ship-locked configuration.

21. A closure assembly comprising: a base; a follower; and a top movably coupled to the base, wherein movement of the top relative to the base causes the follower to rotate about a rotation axis between a closed position and an open position to open and close a fluid flow path to a fluid orifice formed within the top.

22. The closure assembly of any preceding clause, wherein movement of the top relative to the base further causes the follower to translate along the rotation axis.

23. The closure assembly of any preceding clause, further comprising a biasing element biasing at least one of the top or the follower away from the base.

24. The closure assembly of any preceding clause, wherein the biasing element is a spring.

25. The closure assembly of any preceding clause, wherein the base comprises a body defining an outer peripheral wall and a central hub.

26. The closure assembly of any preceding clause, wherein the outer peripheral wall defines a top receiving volume for receiving the top.

27. The closure assembly of any preceding clause, further comprising one or more locking slots formed on an interior surface of the outer peripheral wall, wherein the one or more locking slots fix the position of the top relative to the base.

28. The closure assembly of any preceding clause, further comprising one or more alignment channels formed on the interior surface of the outer peripheral wall, wherein the one or more locking slots extend laterally from the one or more alignment channels via a transition region.

29. The closure assembly of any preceding clause, wherein the transition region comprises one or more ribs.

30. The closure assembly of any preceding clause, the central hub is positioned radially inward from the outer peripheral wall.

31. The closure assembly of any preceding clause, further comprising a connecting wall extending between and connecting the outer peripheral wall and the central hub.

32. The closure assembly of any preceding clause, wherein the connecting wall defines a bottle neck-receiving orifice.

33. The closure assembly of any preceding clause, wherein the bottle neck-receiving orifice includes one or more mating retention features sized and shaped to mate with retention features of a bottle neck positioned within the bottle neck-receiving orifice.

34. The closure assembly of any preceding clause, wherein the central hub defines a cam path shaped to guide the follower between the open position and the closed position.

35. The closure assembly of any preceding clause, wherein the cam path includes a plurality of opening slots corresponding to the open position and a plurality of closing slots corresponding to the closed position.

36. The closure assembly of any preceding clause, wherein the central hub comprises an outer hub wall and an inner hub wall concentrically positioned within the outer hub wall.

37. The closure assembly of any preceding clause, wherein a spacing between the inner hub wall and the outer hub wall is sized and shaped to receive a portion of the top and/or a biasing element.

38. The closure assembly of any preceding clause, wherein the inner hub wall comprises an inner diameter and the cam path is circumferentially formed on the inner diameter.

39. The closure assembly of any preceding clause, wherein the plurality of opening slots are longer than the plurality of closing slots.

40. The closure assembly of any preceding clause, wherein each of the plurality of opening slots and the plurality of closing slots include a leading angled surface configured to guide the follower to be seated in either an opening slot or a closing slot.

41. The closure assembly of any preceding clause, wherein the plurality of opening slots are opened ended at both ends and the plurality of closing slots are closed at an upper end of the plurality of closing slots.

42. The closure assembly of any preceding clause, further comprising a plug positioned concentrically within the inner hub wall, wherein the plug is selectively positionable to block the fluid flow path to the fluid orifice of the top.

43. The closure assembly of any preceding clause, wherein the plug is coupled to the inner hub wall via a connecting plate.

44. The closure assembly of any preceding clause, wherein the inner hub wall and/or the connecting plate comprise one or more cutouts radially positioned around the plug, wherein the one or more cutouts define fluid inlets into the closure assembly.

45. The closure assembly of any preceding clause, wherein the base comprises: an outer peripheral wall; and a connecting wall; and one or more retaining flanges extending from the connecting wall, within the outer peripheral wall.

46. The closure assembly of any preceding clause, wherein the one or more retaining flanges are positioned between the outer peripheral wall and the central hub.

47. The closure assembly of any preceding clause, wherein the one or more retaining flanges include a first retaining flange and a second retaining flange.

48. The closure assembly of any preceding clause, wherein the one or more retaining flanges each comprise a hooked end configured to engage a corresponding feature of the top.

49. The closure assembly of any preceding clause, wherein the follower comprises a tubular, elongate body extending between a first end and a second end and defines a fluid flow path extending between the first end and the second end.

50. The closure assembly of any preceding clause, wherein the follower further comprises a plurality of top follower teeth extending from the first end and arranged radially around the fluid flow path.

51. The closure assembly of any preceding clause, wherein the follower further comprises a plurality of base follower teeth sized and shaped to be received with a cam path of the base.

52. The closure assembly of any preceding clause, wherein the plurality of base follower teeth extend radially from the second end.

53. The closure assembly of any preceding clause, wherein the elongate body includes: a first diameter portion at a first end of the elongate body; a second diameter portion extending from the first diameter potion toward a second end of the elongate body; and a third diameter portion extending from the second diameter portion to the second end.

54. The closure assembly of any preceding clause, wherein the first dimeter portion has a larger diameter than the second diameter portion and the second diameter portion has a larger diameter than the third diameter portion.

55. The closure assembly of any preceding clause, wherein the follower is positioned within the central hub of the base.

56. The closure assembly of any preceding clause, further comprising one or more sealing rings extending radially from the elongate body.

57. The closure assembly of any preceding clause, wherein the one or more sealing rings includes at least one sealing ring configured to circumferentially engage the inner hub wall thereby providing a fluid seal between the inner hub wall and the follower.

58. The closure assembly of any preceding clause, wherein in a ship-locked orientation, the first diameter portion engages or is positioned within close proximity to the inner hub wall.

59. The closure assembly of any preceding clause, wherein the one or more sealing rings comprise at least one sealing ring extending radially from the elongate body into the fluid flow path and configured to engage the plug in the ship-locked and/or a closed configuration.

60. The closure assembly of any preceding clause, wherein the top comprises: an inner surface; an outer surface opposite the inner surface; and a fluid orifice extending through the inner surface and the outer surface.

61. The closure assembly of any preceding clause, wherein the outer surface defines a planar portion and a sloped portion extending to the fluid orifice, such that the fluid orifice is recessed relative to the planar portion.

62. The closure assembly of any preceding clause, further comprising a fluid orifice wall extending from the inner surface.

63. The closure assembly of any preceding clause, further comprising a plurality of top teeth extending from the inner surface and arranged circumferentially around the fluid orifice and/or the fluid orifice wall, wherein the plurality of top teeth are configured to mesh with the top follower teeth of the follower.

64. The closure assembly of any preceding clause, further comprising a top central hub circumscribing the plurality of top teeth and the fluid orifice.

65. The closure assembly of any preceding clause, wherein the top central hub comprises one or more alignment ribs extending along a surface of the top central pub and engage the outer hub wall.

66. The closure assembly of any preceding clause, further comprising one or more top retaining flanges extending from the inner surface of the top, each of the one or more top retaining flanges comprising a hook configured to interact with the retaining flanges of the base thereby limiting a distance the top extends relative to the base.

67. The closure assembly of any preceding clause, further comprising an outer top peripheral wall extending from the second surface of the top, the outer top peripheral wall being sized and shaped to be received within a top receiving volume of the base.

68. The closure assembly of any preceding clause, wherein the top further includes one or more locking projections configured to sit within and engage with the one or more alignment channels of the base.

69. The closure assembly of any preceding clause, wherein the one or more locking projections are configured to be selectively moved into the one or more locking slots extending from the alignment channels.

70. The closure assembly of any preceding clause, further comprising an indicator indicating a configuration of the closure assembly, the indicator indicating an open configuration, a closed configuration, or a ship-locked configuration.

71. The closure assembly of any preceding clause, wherein the indicator is located on the outer top peripheral wall.

72. The closure assembly of any preceding clause, wherein the top is mounted to the base such that the follower is sandwiched between the base and the top.

73. The closure assembly of any preceding clause, wherein the fluid orifice wall is nested within the fluid flow path defined by the follower.

74. The closure assembly of any preceding clause, further comprising a sealing ring extending radially inward into the fluid flow path at a top end of the follower and engaged with the fluid orifice wall, thereby preventing fluid from flowing between the fluid orifice wall and the follower.

75. The closure assembly of any preceding clause, further comprising a sealing ring extending radially outward from the fluid orifice wall to engage the elongate body of the follower within the fluid flow path.

76. The closure assembly of any preceding clause, wherein the top is slidable relative to the base and/or the follower.

77. The closure assembly of any preceding clause, further comprising a biasing element configured to bias the top and/or the follower away from the base.

78. The closure assembly of any preceding clause, wherein the biasing element biases the top follower teeth of the follower into engagement with the top teeth of the top.

79. The closure assembly of any preceding clause within the biasing element is a helical spring.

80. The closure assembly of any preceding clause, comprising a ship-locked configuration, wherein the motion of the top is locked relative to the base.

81. The closure assembly of any preceding clause wherein the top is positioned within the ship-locked position via rotation of the top relative to the base.

82. The closure assembly of any preceding clause, wherein the top is positioned within the ship-locked position via rotation of the top relative to the base such that the one or more locking projections of the top are positioned within the one or more locking slots of the base.

83. The closure assembly of any preceding clause, wherein the plug is seated within the fluid flow path of the follower in the ship-locked configuration.

84. The closure assembly of any preceding clause, wherein the top follower teeth are fully meshed to the top teeth and the base follower teeth are positioned outside of the opening slots and the closing slots in the ship-locked configuration.

85. The closure assembly of any preceding clause, wherein movement of the top out of the ship-locked configuration causes the top to translate relative to the base such that the base follower teeth enter one of the opening slots or the closing slots to positioned the closure assembly in one of an open configuration and a closed configuration.

86. The closure assembly of any preceding clause, wherein in the open configuration, the biasing element biases the top and the following to move the follower to an open position.

87. The closure assembly of any preceding clause, wherein in the open configuration, the top is displaced relative to the base a maximum extent.

88. The closure assembly of any preceding clause, wherein in the open configuration the top follower teeth of the follower are in contact but unmeshed with the top teeth of the top.

89. The closure assembly of any preceding clause, wherein in the open configuration the plug is spaced from the fluid flow path of the follower.

90. The closure assembly of any preceding clause, wherein force on the top causes the top teeth to engage the top follower teeth, thereby introducing a rotational moment in the follower, and causes the base follower teeth to translate out of one of the opening slots or the closing slots, wherein translation out of the one of the opening slots or the closing slots allows the follower to rotate such that the base follower teeth enters the other of the opening slots or the closing slots.

81. The closure assembly of any preceding clause, wherein meshing of the top teeth with the top follower teeth results in a tactile or auditory response.

92. The closure assembly of any preceding clause, wherein the plug is seated within the fluid flow path of the follower in the closed configuration and is spaced from the fluid flow path of the follower in the open configuration.

93. The closure assembly of any preceding clause, wherein the plug is more deeply seated within the fluid flow path of the follower in the ship-locked configuration versus the closed configuration.

94. The closure assembly of any preceding clause, wherein the indicator is hidden within the base in the closed configuration.

95. The closure assembly of any preceding clause, wherein the follower comprises one or more sealing flanges.

96. The closure assembly of any preceding clause, wherein the one or more sealing flanges comprises two sealing flanges.

97. The closure assembly of any preceding clause, wherein the follower comprises a first flexible seal extending from the second diameter portion and a second flexible seal positioned within the fluid flow path.

98. The closure assembly of any preceding clause, wherein the follower comprises an extending portion, which extends through the fluid orifice of the top.

99. The closure assembly of any preceding clause, wherein the plug is hollow.

100. The closure assembly of any preceding clause, wherein the follower comprises a sealing lip configured to engage the inner hub wall.

101. The closure assembly of any preceding clause, wherein the follower comprises a retaining rib extending from the sealing lip and the first diameter portion.

102. The closure assembly of any preceding clause, wherein the follower comprises one or more flow channels positioned around the plug and extending from a sealing orifice, wherein the plug is positioned within the follower in both an open configuration and a closed configuration.

103. The closure assembly of any preceding clause, further comprising a stem coupled and extending from the top, wherein the stem circumscribes a fluid orifice formed in the top and extends from the fluid orifice through the base.

104. The closure assembly of any preceding clause, wherein the stem is integral with the top.

105. The closure assembly of any preceding clause, wherein the top further comprises a plurality of top teeth positioned at a base of the stem.

106. The closure assembly of any preceding clause, wherein the base comprises a central hub comprising an outer hub wall and an inner hub wall, wherein a cam path is formed on an external diameter of the inner hub wall.

107, The closure assembly of any preceding clause, wherein plug is positioned concentrically within the inner hub wall.

108. The closure assembly of any preceding clause, the follower includes top follower teeth and bottom follower teeth formed on an inner diameter of the follower.

109. The closure assembly of any preceding clause, wherein the stem extends through the central hub of the base.

110. The closure assembly of any preceding clause, wherein the follower is positioned between the inner hub wall and the outer hub wall and is engaged with the top teeth of the stem and the cam path of the central hub.

111. The closure assembly of any preceding clause, further comprising an indicator comprising a protruding surface protruding from the outer top peripheral wall.

110. The closure assembly of any preceding clause, further comprising an indicator comprising a flexible tab formed in the outer top peripheral wall of the top.

112. The closure assembly of any preceding clause, wherein cutouts are positioned on either side of the flexible tab.

113. The closure assembly of any preceding clause, wherein the flexible tab comprises a locking rib configured to flex and snap out of the base in the open configuration.

114. The closure assembly of any preceding clause, further comprising a first tuning flange extending from an inner surface of the top and a second tuning flange extending from the follower, wherein the first and second tuning flanges are positioned to engage one another to slow a speed and/or reduce an impact force of the top follower teeth meshing with the top teeth.

115. The closure assembly of any preceding clause, wherein the first tuning flange is positioned radially within the plurality of top teeth.

116. The closure assembly of any preceding clause, wherein the second tuning flange is positioned radially within the plurality of top follower teeth.

117. The closure assembly of any preceding clause, wherein the second tuning flange comprises a sloped lead surface engaged with the first tuning flange.

118. The closure assembly of any preceding clause, wherein the base comprises a outer peripheral wall and a central hub defining a cam path including a plurality of opening slots and a plurality of closing slots.

119. The closure assembly of any preceding clause, wherein the cam path is formed on an outer perimeter of the central hub 120. The closure assembly of any preceding clause, wherein the follower comprises a follower body comprising a sidewall and a top wall.

121. The closure assembly of any preceding clause, wherein the follower includes a plurality of top follower teeth extending from the top wall and circumscribing a stem receiving orifice.

122. The closure assembly of any preceding clause, wherein follower includes a plurality of base follower teeth extending inward from the sidewall.

123. The closure assembly of any preceding clause, wherein the top comprises a stem fluidly coupled to the fluid orifice and extending below the outer top peripheral wall, wherein the stem includes a fluid inlet opening.

124. The closure assembly of any preceding clause, wherein the fluid inlet opening is positioned along a sidewall of the stem.

125. The closure assembly of any preceding clause further comprising a plug cap mounted over an end of the stem.

126. The closure assembly of any preceding clause wherein the plug cap is engaged with the central hub in the close configuration.

127. The closure assembly of any preceding clause, wherein the central hub comprises a sealing sleeve though which the stem moves, the sealing sleeve being configured to selectively seal the fluid inlet opening of the stem when positioned within the sealing sleeve.

128. The closure assembly of any preceding clause, further comprising a ship-locking mechanism include one or more push tabs.

129. The closure assembly of any preceding clause, wherein the one or more push tabs extend laterally from an outer top peripheral wall of the top, through one or more windows formed within an outer peripheral wall of the base.

130. The closure assembly of any preceding clause, further comprising a ship-locking mechanism including one or more top locking tabs formed in the top and one or more base locking tabs formed in the base.

131. The closure assembly of any preceding clause, wherein the one or more top locking tabs project laterally from the outer top peripheral wall of the top and the one or more base locking tabs extend inward from the outer peripheral wall of the base, and wherein in the ship-locked configuration the one or more base locking tabs are positioned over and in contact with the one or more top locking tabs.

132. The closure assembly of any preceding clause, wherein the plurality of opening slots are shorter than the plurality of closing slots.

133. A product contain comprising a container body and a closure assembly according to any preceding clause coupled to the container body.

It should now be understood that the present disclosure is directed to product containers and closure assemblies which provide for an improved user experience in dispensing products. For example, embodiments of the present disclosure may be operated by a user so as to encourage the user to maintain the closure in a downward facing direction before, after, and throughout use to reduce risk for aspiration of air into the product container. In some embodiments, closure assemblies as disclosed herein may provide tactile and/or auditory feedback for indicating whether a fluid orifice is sealed or open to allow product to flow therethrough. As should be understood, closure assemblies according to embodiments of the present disclosure generally include a top, a base, and a follower. The follower may rotate between an open position and a closed position which respectively open and close a fluid path to a fluid orifice formed within the top via pressing on the top. Each time a user depresses the top, the follower rotates and contacts at least one of the top and the base, which may cause a tactile and/or auditory response, indicating to the user that the fluid path is opened or closed. As the closure assembly is operated via pressing the top, a user can easily maintain the product container in a substantially vertical orientation with the closure assembly facing in a downward direction, thereby encouraging product to remain at the closure assembly and discourage aspiration of air into the product container. Additionally, embodiments of the present disclosure may be ergonomically configured for single handed use, as opposed to two handed use needed for many flip-top arrangements. For example, a user may grasp the product container and press the closure assembly against a surface to open and/or close the product container.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A closure assembly comprising:
a top comprising:
a user engagement portion defining a fluid orifice therethrough, the user engagement portion comprising:
an outer surface;
an inner surface opposite the outer surface, wherein the fluid orifice extends through the outer surface and the inner surface; and
a plurality of top teeth extending from the inner surface and arranged around the fluid orifice;
a base coupled to the top, wherein the top is moveable relative to the base, the base comprising a central hub defining a cam path comprising a plurality of opening slots and a plurality of closing slots; and
a follower positioned between the top and the base, the follower comprising a plurality of top follower teeth engaged with the plurality of top teeth of the top and a plurality of base follower teeth disposed in the cam path of the base, wherein:
the top and the follower are biased away from the base; and
depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

2. The closure assembly of claim 1, wherein rotation of the follower between the open positioned and the closed position creates an audible or tactile indication that the follower has transitioned between the open position and the closed position.

3. The closure assembly of claim 1, wherein the outer surface comprises a sloped portion that slopes to the fluid orifice.

4. The closure assembly of claim 1, further comprising a helical spring positioned between and in contact with the base and the follower, wherein the helical spring biases the top and the follower away from the base.

5. The closure assembly of claim 1, wherein:
the base comprises one or more locking slots,
the top comprises one or more locking projections, and
the top is rotated relative to the base to position the one or more locking projections in the one or more locking slots, thereby locking the top in a ship-locked configuration.

6. The closure assembly of claim 1, further comprising a plug, wherein:
when the follower is in the closed position, the plug is positioned within the follower to block the fluid flow path to the fluid orifice; and
when the follower is in the open position, the plug is spaced from the follower.

7. A closure assembly comprising:
a top comprising:
a user engagement portion defining a fluid orifice therethrough, the user engagement portion comprising:
an outer surface;
an inner surface opposite the outer surface, wherein the fluid orifice extends through the outer surface and the inner surface; and
a plurality of top teeth extending from the inner surface and arranged around the fluid orifice;
a base coupled to the top, wherein the top is moveable relative to the base, the base comprising a central hub defining an cam path formed on an inner diameter of the central hub, the cam path comprising a plurality of opening slots and a plurality of closing slots; and
a follower positioned within the central hub of the base and extending between the top and the base, the follower comprising a plurality of top follower teeth engaged with the plurality of top teeth of the top and a plurality of base follower teeth disposed in the cam path of the base, wherein:
the top and the follower are biased away from the base; and
depressing the top relative to the base causes the follower to rotate relative to the top between an open position in which the plurality of base follower teeth are positioned within the plurality of opening slots and a fluid flow path is open to the fluid orifice and a closed position in which the plurality of base follower teeth are positioned within the plurality of closing slots and the fluid flow path is closed to the fluid orifice.

8. The closure assembly of claim 7, wherein rotation of the follower between the open positioned and the closed position creates an audible or tactile indication that the follower has transitioned between the open position and the closed position.

9. The closure assembly of claim 7, wherein the outer surface comprises a sloped portion that slopes to the fluid orifice.

10. The closure assembly of claim 7, wherein the top comprises a fluid orifice wall extending from the inner surface of the top around the fluid orifice.

11. The closure assembly of claim 10, the follower comprises an elongate body defining the fluid flow path and the fluid orifice wall is positioned within the elongate body of the follower.

12. The closure assembly of claim 11, wherein:
the base comprises a plug coupled to and positioned concentrically within the central hub;
the plug is positioned within and seals the fluid flow path of the follower when the follower rotates to the closed position; and
the plug is spaced from the fluid flow path of the follower when the follower rotates to the open position.

13. The closure assembly of claim 12, wherein the follower comprises a first flexible seal extending radially outward from the elongate body of the follower, and a second flexible seal extending radially into the fluid flow path from the elongate body of the follower.

14. The closure assembly of claim 7, wherein:
the base comprises one or more locking slots, the top comprises one or more locking projections, and the top is rotated relative to the base to position the one or more locking projections in the one or more locking slots, thereby locking the top in a ship-locked configuration.

15. A product container comprising:
a container body; and
a closure assembly coupled to the container body, the closure assembly comprising:
   a base coupled to the container body and comprising a cam path comprising a plurality of opening slots and a plurality of closing slots;
   a top moveably coupled to the base and comprising a fluid orifice and a plurality of top teeth arranged circumferentially around the fluid orifice; and
   a follower comprising a plurality of top follower teeth engaged with the plurality of top teeth of the top and a plurality of base follower teeth disposed in the cam path of the base, wherein depression of the top relative to the base causes the follower to rotate relative to the top between an open position in which the plurality of base follower teeth are positioned within the plurality of opening slots and a fluid flow path extending from the container body to the fluid orifice is opened and a closed position in which the plurality of base follower teeth are positioned within the plurality of closing slots and the fluid flow path is closed.

16. The closure assembly of claim 15, wherein rotation of the follower between the open positioned and the closed position creates an audible or tactile indication that the follower has transitioned between the open position and the closed position.

17. The closure assembly of claim 15, wherein the fluid flow path extends through the follower to the fluid orifice.

18. The closure assembly of claim 17, wherein:
   the base comprises a plug positioned concentrically with the cam path;
   the plug is positioned within and seals the fluid flow path of the follower when the follower rotates to the closed position; and
   the plug is spaced from the fluid flow path of the follower when the follower rotates to the open position.

19. The closure assembly of claim 18, wherein the follower comprises a first flexible seal extend extending radially outward from an elongate body of the follower, and a second flexible seal extending radially into the fluid flow path from the elongate body of the follower.

20. The closure assembly of claim 15, wherein:
   the base comprises one or more locking slots,
   the top comprises one or more locking projections, and
   the top is rotated relative to the base to position the one or more locking projections in the one or more locking slots, thereby locking the top in a ship-locked configuration.

* * * * *